United States Patent
Hewett et al.

(10) Patent No.: US 12,013,474 B2
(45) Date of Patent: Jun. 18, 2024

(54) METHODS AND APPARATUS FOR LOCATING RFID TAGS

(71) Applicant: Automaton, Inc., San Diego, CA (US)

(72) Inventors: Spencer Hewett, New York, NY (US); Adam Blair, New York, NY (US); Ken Seiff, New York, NY (US); Michael Murphy, Brooklyn, NY (US); Mark Wieman, Seattle, WA (US); Tamara Adlin, Seattle, WA (US)

(73) Assignee: Automaton, Inc., San Diego, CA (US)

( * ) Notice: Subject to any disclaimer, the term of this patent is extended or adjusted under 35 U.S.C. 154(b) by 262 days.

(21) Appl. No.: 17/199,308

(22) Filed: Mar. 11, 2021

(65) Prior Publication Data

US 2021/0199747 A1 Jul. 1, 2021

Related U.S. Application Data

(63) Continuation of application No. 16/717,249, filed on Dec. 17, 2019, now Pat. No. 11,408,965, which is a
(Continued)

(51) Int. Cl.
| | |
|---|---|
| *G01S 5/02* | (2010.01) |
| *G01S 5/04* | (2006.01) |
| *G06K 7/10* | (2006.01) |

(52) U.S. Cl.
CPC ............ *G01S 5/02* (2013.01); *G01S 5/0218* (2020.05); *G01S 5/0273* (2013.01);
(Continued)

(58) Field of Classification Search
CPC ..... G01S 5/0273; G01S 5/04; G06K 7/10297; G06K 7/10465
See application file for complete search history.

(56) References Cited

U.S. PATENT DOCUMENTS

| | | |
|---|---|---|
| 4,243,988 A | 1/1981 | Kang et al. |
| 5,267,334 A | 11/1993 | Normille et al. |
| (Continued) | | |

FOREIGN PATENT DOCUMENTS

| | | |
|---|---|---|
| CN | 203775285 U | 8/2014 |
| DE | 102004025663 A1 | 12/2005 |
| (Continued) | | |

OTHER PUBLICATIONS

Ni, Lionel M. et al., "LANDMARC: Indoor Location Sensing Using Active RFID", Proceedings of the First IEEE International Conference on Pervasive Computing and Communications, 2003 (Year: 2003).*

(Continued)

*Primary Examiner* — Cassi J Galt
(74) *Attorney, Agent, or Firm* — Smith Baluch LLP

(57) ABSTRACT

A radio frequency identification (RFID) system includes an array of antennas to distinguish line-of-sight (LOS) paths from non-line-of-sight (NLOS) paths. The distance between adjacent antennas in the array of antennas is less than half the wavelength of the radio frequency (RF) signal of the system. Each antenna in the antenna array is also digitally controlled to change relative phase difference among the antennas, thereby allowing digital steering of the array of antennas across angles of arrival (AOAs) between 0 and $\pi$. The digital steering generates a plot of signal amplitudes as a function of AOAs. LOS paths are distinguished from NLOS paths based on the shapes (e.g., depth, gradient, etc.) of local extremes (e.g., maxima or minima) in the plot.

43 Claims, 20 Drawing Sheets

Related U.S. Application Data continuation of application No. 16/579,949, filed on Sep. 24, 2019, now Pat. No. 11,215,691, which is a continuation of application No. PCT/US2018/024950, filed on Mar. 28, 2018.

(60) Provisional application No. 62/577,530, filed on Oct. 26, 2017, provisional application No. 62/477,796, filed on Mar. 28, 2017.

(52) U.S. Cl.
CPC .............. *G01S 5/0294* (2013.01); *G01S 5/04* (2013.01); *G06K 7/10297* (2013.01); *G06K 7/10465* (2013.01)

(56) References Cited

U.S. PATENT DOCUMENTS

| | | | |
|---|---|---|---|
| 6,064,339 A * | 5/2000 | Wax | G01S 5/02521 342/417 |
| 7,312,752 B2 | 12/2007 | Smith et al. | |
| 7,327,383 B2 | 2/2008 | Valleriano et al. | |
| 7,436,306 B2 | 10/2008 | Berger et al. | |
| 7,436,309 B2 | 10/2008 | Koele | |
| 7,520,424 B2 | 4/2009 | Haberler | |
| 7,652,576 B1 | 1/2010 | Crossno et al. | |
| 7,667,652 B2 | 2/2010 | Gevargiz et al. | |
| 7,760,095 B2 | 7/2010 | Murrah | |
| 8,094,026 B1 | 1/2012 | Green | |
| 8,184,154 B2 | 5/2012 | Estevez et al. | |
| 8,350,675 B2 | 1/2013 | Riechel | |
| 8,441,354 B2 | 5/2013 | Padmanabhan et al. | |
| 8,847,739 B2 | 9/2014 | Wilson et al. | |
| 8,938,255 B2 | 1/2015 | Tsruya et al. | |
| 9,036,028 B2 | 5/2015 | Buehler | |
| 9,111,156 B2 | 8/2015 | Sadr et al. | |
| 9,183,717 B1 | 11/2015 | Diorio et al. | |
| 9,311,799 B2 | 4/2016 | Jain et al. | |
| 9,652,912 B2 | 5/2017 | Fadell et al. | |
| 9,664,510 B2 | 5/2017 | Nathan et al. | |
| 9,881,473 B1 | 1/2018 | Diorio et al. | |
| 9,911,290 B1 | 3/2018 | Zalewski et al. | |
| 9,959,494 B1 | 5/2018 | Shyamkumar et al. | |
| 10,013,860 B2 | 7/2018 | Hewett | |
| 10,386,474 B2 | 8/2019 | Hewett | |
| 10,451,706 B1 | 10/2019 | Hollar | |
| 10,521,768 B1 | 12/2019 | Diorio et al. | |
| 10,572,703 B1 | 2/2020 | Shyamkumar et al. | |
| 10,687,303 B2 | 6/2020 | Kurras et al. | |
| 10,860,819 B1 | 12/2020 | Pesavento et al. | |
| 10,871,558 B2 | 12/2020 | Hewett | |
| 10,956,693 B1 | 3/2021 | Shyamkumar et al. | |
| 11,043,093 B2 | 6/2021 | Hewett | |
| 11,215,691 B2 | 1/2022 | Hewett et al. | |
| 11,408,965 B2 | 8/2022 | Hewett et al. | |
| 11,543,512 B2 | 1/2023 | Hewett | |
| 2001/0049636 A1 | 12/2001 | Hudda et al. | |
| 2004/0143505 A1 | 7/2004 | Kovach | |
| 2004/0169587 A1 | 9/2004 | Washington | |
| 2004/0228503 A1 | 11/2004 | Cutler | |
| 2005/0008199 A1 | 1/2005 | Dong et al. | |
| 2005/0185544 A1 | 8/2005 | Berger | |
| 2005/0206555 A1 | 9/2005 | Bridgelall et al. | |
| 2005/0242926 A1 | 11/2005 | Berger | |
| 2005/0263592 A1 | 12/2005 | Berger et al. | |
| 2006/0027646 A1 | 2/2006 | Haberler | |
| 2006/0177291 A1 | 8/2006 | Kienzl et al. | |
| 2006/0187053 A1 | 8/2006 | Koele | |
| 2006/0206704 A1 | 9/2006 | Gauby et al. | |
| 2007/0001808 A1 | 1/2007 | Kastelic et al. | |
| 2007/0073513 A1 | 3/2007 | Posamentier | |
| 2007/0235527 A1 | 10/2007 | Appleyard et al. | |
| 2008/0112699 A1 | 5/2008 | Huseth et al. | |
| 2008/0143482 A1 | 6/2008 | Shoarinejad et al. | |
| 2008/0143584 A1 | 6/2008 | Shoarinejad et al. | |
| 2008/0243626 A1 | 10/2008 | Stawar et al. | |
| 2009/0012704 A1 | 1/2009 | Franco et al. | |
| 2009/0212921 A1 | 8/2009 | Wild et al. | |
| 2009/0271251 A1 | 10/2009 | Sorensen et al. | |
| 2009/0322489 A1 | 12/2009 | Jones et al. | |
| 2010/0001842 A1 | 1/2010 | Duron et al. | |
| 2010/0039228 A1 | 2/2010 | Sadr et al. | |
| 2010/0045436 A1 | 2/2010 | Rinkes | |
| 2010/0015665 A1 | 6/2010 | Broer | |
| 2010/0148985 A1 | 6/2010 | Lin et al. | |
| 2010/0156651 A1 | 6/2010 | Broer | |
| 2010/0201520 A1 | 8/2010 | Stern et al. | |
| 2010/0287057 A1 | 11/2010 | Aihara et al. | |
| 2011/0071921 A1 | 3/2011 | Crespo et al. | |
| 2011/0133905 A1 | 6/2011 | Hussain et al. | |
| 2011/0134240 A1 | 6/2011 | Anderson et al. | |
| 2011/0145093 A1 | 6/2011 | Paradise et al. | |
| 2011/0199211 A1 | 8/2011 | Campero et al. | |
| 2011/0320322 A1 | 12/2011 | Roslak et al. | |
| 2012/0044054 A1 | 2/2012 | Hussain et al. | |
| 2012/0094683 A1 | 4/2012 | Yoeli | |
| 2012/0127976 A1 | 5/2012 | Lin et al. | |
| 2013/0154802 A1 | 6/2013 | O'haire et al. | |
| 2013/0201003 A1 | 8/2013 | Sabesan et al. | |
| 2014/0035731 A1 | 2/2014 | Chan et al. | |
| 2014/0159869 A1 | 6/2014 | Zumsteg et al. | |
| 2014/0285324 A1 | 9/2014 | Austin | |
| 2014/0361078 A1 | 12/2014 | Davidson | |
| 2015/0039458 A1 | 2/2015 | Reid | |
| 2015/0120514 A1 * | 4/2015 | Deshpande | G06Q 30/016 705/28 |
| 2015/0122886 A1 | 5/2015 | Koch | |
| 2015/0199890 A1 | 7/2015 | Hewett et al. | |
| 2016/0126753 A1 | 5/2016 | Wight et al. | |
| 2017/0116443 A1 | 4/2017 | Bolic et al. | |
| 2017/0149294 A1 | 5/2017 | Wight et al. | |
| 2018/0276963 A1 | 9/2018 | Hewett | |
| 2019/0331785 A1 | 10/2019 | Hewett | |
| 2020/0096599 A1 | 3/2020 | Hewett et al. | |
| 2020/0124696 A1 | 4/2020 | Hewett et al. | |
| 2021/0199748 A1 | 7/2021 | Hewett et al. | |
| 2021/0304576 A1 | 9/2021 | Hewett | |
| 2022/0082651 A1 | 3/2022 | Hewett et al. | |
| 2023/0130857 A1 | 4/2023 | Hewett | |

FOREIGN PATENT DOCUMENTS

| | | |
|---|---|---|
| DE | 102004055931 A1 | 6/2006 |
| DE | 102006007776 A1 | 8/2007 |
| DE | 102008063981 A1 | 5/2010 |
| DE | 102009016557 A1 | 10/2010 |
| EP | 1573645 A1 | 9/2005 |
| EP | 1658575 A1 | 5/2006 |
| EP | 1821236 A2 | 8/2007 |
| EP | 1658575 B1 | 12/2007 |
| EP | 1821236 A3 | 8/2008 |
| EP | 2239683 A1 | 10/2010 |
| EP | 2239683 81 | 7/2013 |
| EP | 3695243 A1 | 8/2020 |
| JP | 2006031062 A | 2/2006 |
| JP | 2006134082 A | 5/2006 |
| JP | 2007316897 A * | 12/2007 |
| KR | 1020060010683 A | 2/2006 |
| KR | 20150139339 A | 12/2015 |
| WO | 2000034799 A1 | 6/2000 |
| WO | 2005024703 A1 | 3/2005 |
| WO | 2014146132 A3 | 10/2014 |
| WO | 2016138800 A1 | 9/2016 |
| WO | 2022226351 A2 | 10/2022 |
| WO | 2022226410 A1 | 10/2022 |
| WO | 2023278652 A1 | 1/2023 |
| WO | 2023114976 A1 | 6/2023 |

OTHER PUBLICATIONS

H.-L. Ding, W. W. Y. Ng, P. P. K. Chan, D.-L. Wu, X.-L. Chen and D. S. Yeung, "RFID indoor positioning using RBFNN with L-GEM," 2010 International Conference on Machine Learning and Cybernet-

(56) References Cited

OTHER PUBLICATIONS ics, Qingdao, China, 2010, pp. 1147-1152, doi: 10.1109/ICMLC. 2010.5580925. (Year: 2010).*

Extended European Search Report In European Patent Application No. 18775411.4 dated May 25, 2021, 28 pages.

Al-Kassab et al., "RFID-enabled business process intelligence in retail stores: a case report." Journal of theoretical and applied electronic commerce research 8, No. 2 (2013): 112-137.

Aryal, "Integrating Camera Recognition and RFID System for Assets Tracking And Warehouse Management." (2012). 41 pages.

Baraniuk et al., "Model-based compressive sensing." IEEE Transactions on Information Theory, 56, No. 4 (2010): 1982-2001.

Dardari et al., "Ultrawide bandwidth RFID: The next generation?." Proceedings of the IEEE 98, No. 9 (2010):1570-1582.

Donoho, "Compressed sensing." IEEE Transactions on Information Theory, vol. 52, No. 4 (2006): 1289-1306.

Ettus Research Universal Software Radio Peripheral. Accessed at http://ettus.com on Sep. 9, 2019, 4 pages.

Fossorier et al., "Reduced complexity iterative decoding of low-density parity check codes based on belief propagation." IEEE Transactions on Communications, vol. 47, No. 5 (1999): 673-680.

Indyk, Tutorial on Compressed Sensing (or Compressive Sampling, or Linear Sketching). Princeton 2008. Available at http://people.csail.mit.edu/indyk/princeton.pdf, 15 pages.

IntelliVision—AI and Video Analytics for Smart Cameras. Accessed at https://www.intelli-vision.com/ on Sep. 4, 2019. 7 pages.

International Search Report and Written Opinion, PCT/US2018/024950, 20 pages (dated Aug. 1, 2018).

International Search Report dated Apr. 5, 2016 in international Application No. PCT/US2015/057206, 13 pages.

International Search Report dated Mar. 15, 2013 in international Application No. PCT/US2012/060123, 12 pages.

Lee et al., "An enhanced dynamic framed slotted ALOHA algorithm for RFID tag identification." The Second Annual International Conference on Mobile and Ubiquitous Systems: Networking and Services. IEEE, 2005, 7 pages.

Li et al., "IDCam: Precise Item Identification for AR Enhanced Object Interactions." 2019 IEEE International Conference on Rfid (RFID). IEEE, 2019. 7 pages.

Mceliece et al., "Turbo decoding as an instance of Pearl's belief propagation algorithm." IEEE Journal on Selected Areas in Communications, vol. 16, No. 2 (1998): 140-152.

Mojix Technology Breakthrouhs. Mojix Inc Oct. 23, 2015. Accessed at http://www.mojix.com/learn_the_difference/technology.php, 4 pages.

Palanki, et al., "Rateless codes on noisy channels." In IEEE International Symposium on Information Theory, pp. 37-37. 2004.

Partial Supplementary European Search Report In European Patent Application No. 18775411.4 dated Jan. 14, 2021, 16 pages.

Ramakrishnan et al., "Performance benchmarks for passive Uhf Rfid tags." MMB 2006 (2006). , 100 pages.

Raman et al., "Execution: The missing link in retail operations." California Management Review 43.3 (2001): 136-152.

Retailer Boosts Sales 14%, Cuts Inventory Management Costs 35% with RFID Solution. Microsoft Customer Solution Retail Industry Case Study. Sep. 2009. Available at http://download.microsoft.com/download/5/4/1/541AF3C9-BD73-4A91-BF7C-ACE0DBF78235/XterpriseAmericanApparelCaseStudy.pdf, 6 pages.

RFID essentials. O'Reilly Media, Inc. Bill Glover, Himanshu Bhatt, 2006 ISBN 0-596-00944-5, pp. 88-89. 4 Pages (including front matter).

Roberti, RFID Delivers Unexpected Benefits at American Apparel. RFID Journal Oct. 5, 2011, 2 pages.

Shih et al. "Taxonomy and survey of RFID anti-collision protocols." Computer Communications 29, No. 11 (2006): 2150-2166.

Vaswani, "LS-CS-residual (LS-CS): compressive sensing on least squares residual." IEEE Transactions on Signal Processing, vol. 58, No. 8 (2010): 4108-4120.

Wang et al., "Efficient and reliable low-power backscatter networks." Acm Sigcomm Computer Communication Review 42, No. 4 (2012): 61-72.

Weiss et al., "On the optimality of solutions of the max-product belief-propagation algorithm in arbitrary graphs." IEEE Transactions on Information Theory, vol. 47, No. 2 (2001): 736-744.

Zhang et al., A batteryless computational RFID and sensing platform. Tech Report UMASS, 2011. Accessed at http://spqr.cs.umass.edu/moo/. 4 pages.

Zhuang et al., "Adaptive key frame extraction using unsupervised clustering." In Image Processing, 1998. ICIP 98. Proceedings. vol. 1, pp. 866-870. IEEE, 1998.

Korean Office Action with English Translation in Korean Application No. 10-2019-7031910, dated Oct. 31, 2022, 6 pages.

Wang et al., "Dude, Where's My Card? RFID Positioning That Works with Multipath and Non-Line of Sight," ACM Special Interest Group on Data Communication, SIGCOMM, 2013, 12 pages.

Li et al. "Review on UHF RFID localization methods." IEEE Journal of Radio Frequency Identification 3.4 (2019): 205-215.

Ayestaran et al. "Sparse deconvolution based on regularisation for echo correction in antenna measurement." IET microwaves, antennas & propagation 6.12 (2012): 1299-1305.

Chinese First Office Action with Search Report with translation in Chinese Appl. No. 201880029031.6 dated Feb. 5, 2024, 23 pages.

Office Action In European Patent Application No. 18775411.4, dated Apr. 8, 2024, 8 pages.

* cited by examiner

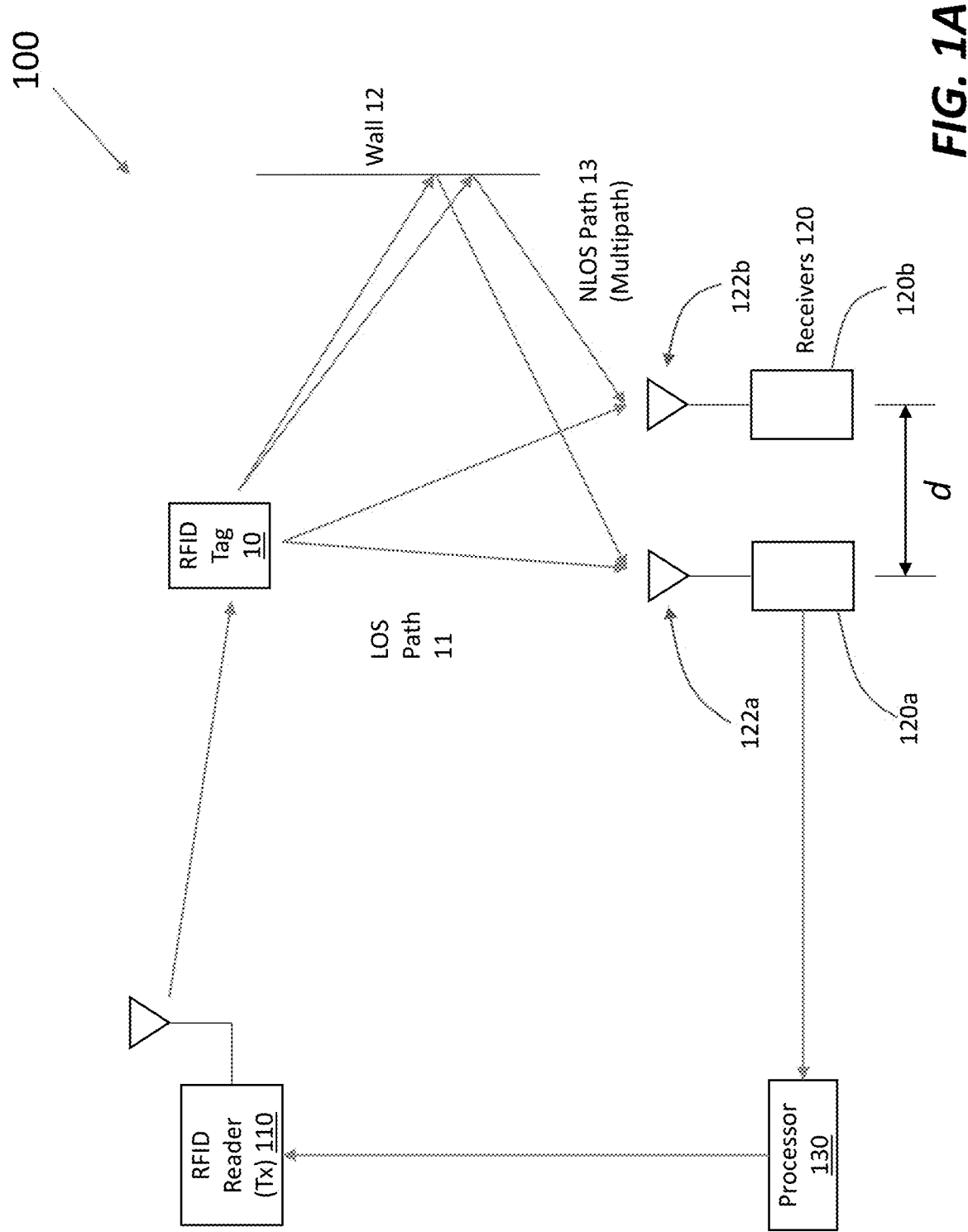

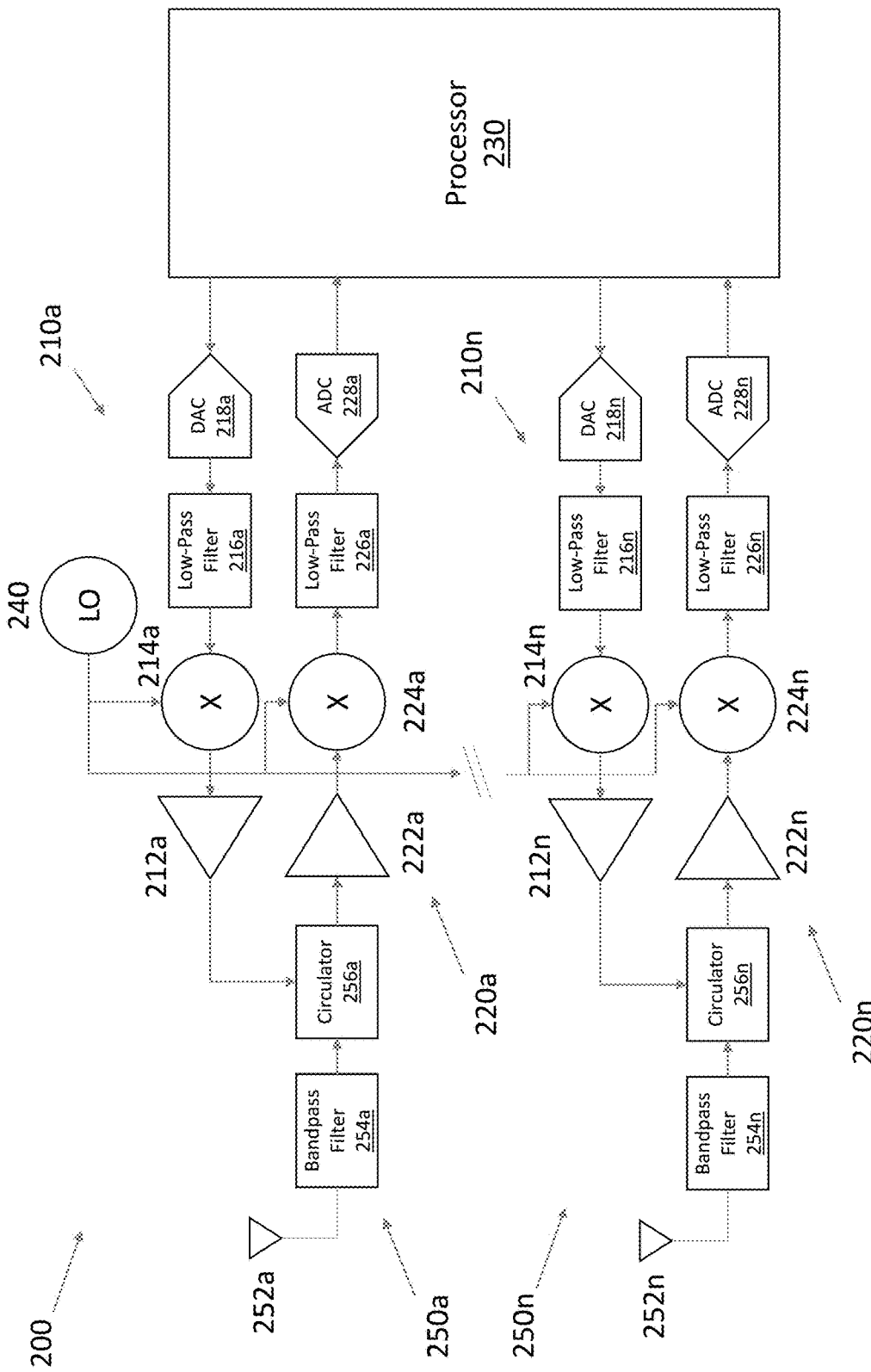

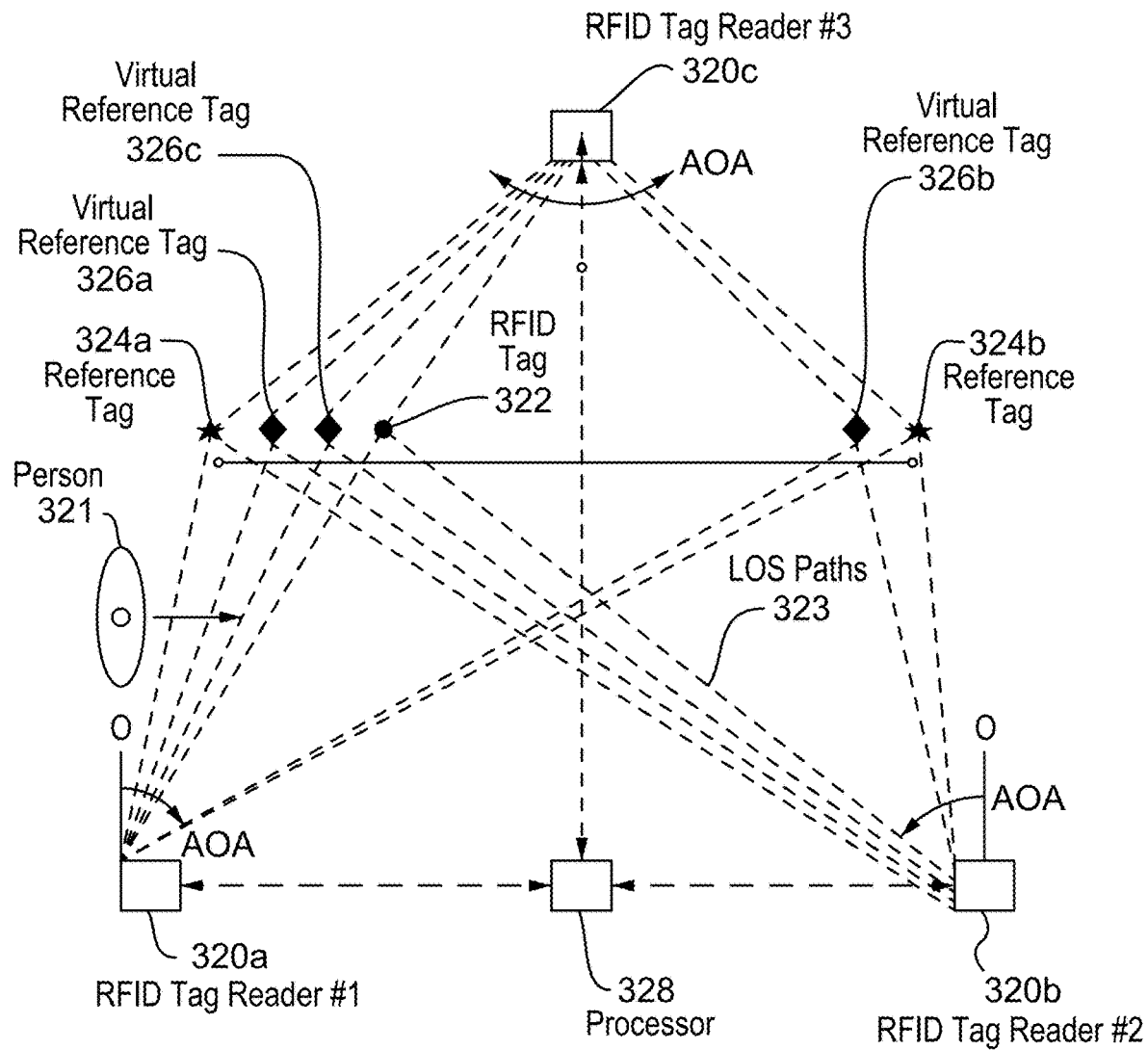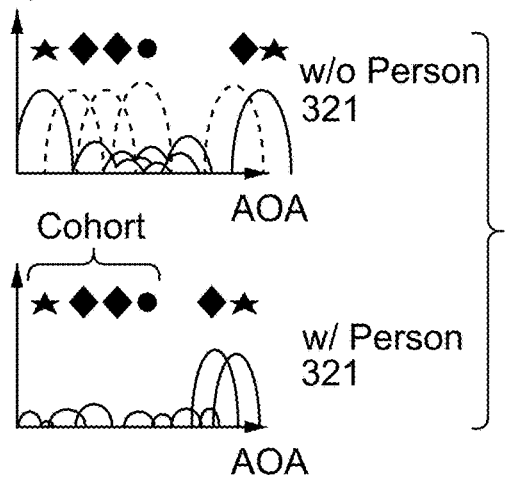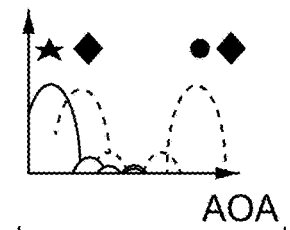
*FIG. 3B*

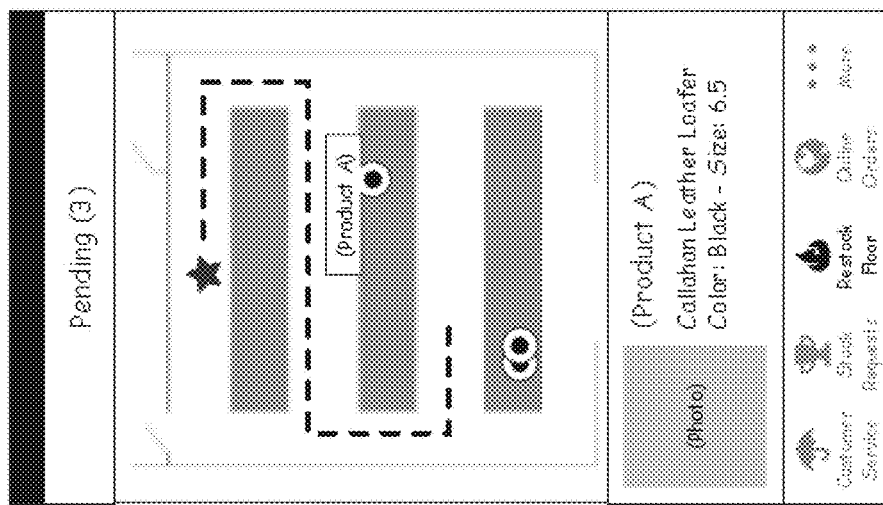
FIG. 9A
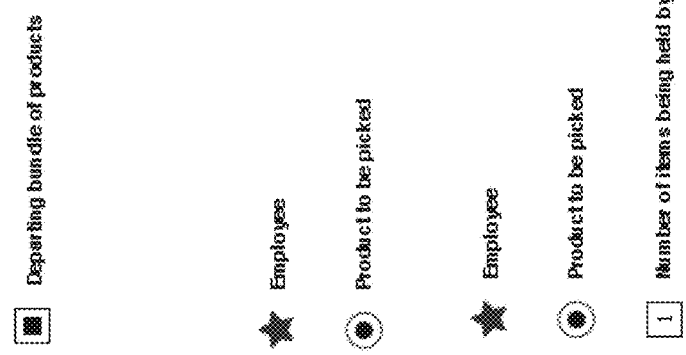
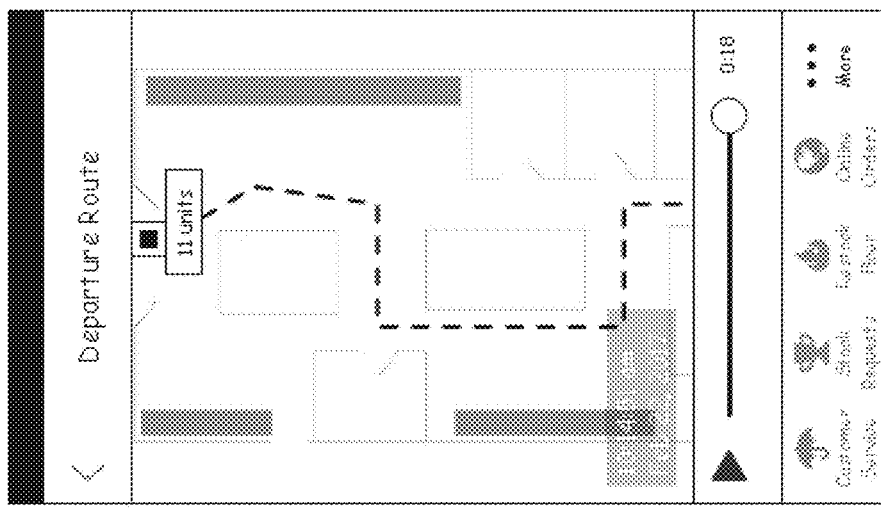
FIG. 8

METHODS AND APPARATUS FOR LOCATING RFID TAGS

CROSS-REFERENCE TO RELATED APPLICATIONS

This application is a continuation of U.S. application Ser. No. 16/717,249, filed on Dec. 17, 2019, which is a continuation of U.S. application Ser. No. 16/579,949, filed on Sep. 24, 2019, which is a bypass continuation of International Application No. PCT/US2018/024950, filed on Mar. 28, 2018, which in turn claims priority, under 35 U.S.C. § 119(e), to U.S. Application No. 62/577,530, filed on Oct. 26, 2017, and to U.S. Application No. 62/477,796, filed on Mar. 28, 2017. Each of these applications is incorporated herein by reference in its entirety.

BACKGROUND

Radio Frequency Identification (RFID) technologies have applications in many commercial areas, such as access control, animal tracking, security, and toll collection. A typical RFID system includes a tag (also referred to as a transponder) and a reader (also referred to as an interrogator). The reader includes an antenna to transmit radio frequency (RF) signals as well as to receive RF signals reflected or emitted by the tag. The tag can also include an antenna and an application-specific integrated circuit (ASIC) or microchip. A unique electronic product code can be assigned to the tag to distinguish it from other tags.

An RFID system can use either an active tag or a passive tag. An active tag contains a transmitter to emit RF signals to the reader and a power source (e.g., a battery) to power the transmitter. In contrast, a passive tag does not contain a power source and draws power generated by a reader via induced current in the tag's antenna. In a passive RFID system, the reader sends a signal using the reader antenna to excite the tag antenna. Once the tag is powered on (excited), the tag sends the stored data back to the reader.

Signals emitted or reflected by the tag can reach the reader via more than one path. For example, the signals can travel along a straight line (referred to as the line-of-sight path or LOS path) from the tag to the reader. The signals may also be reflected or scattered off obstructions (e.g., walls and other objects distributed throughout the environment) before reaching the reader. These paths are referred to as non-line-of-sight (NLOS) paths. In some cases, a given signal may take multiple paths to the receiver, causing several copies of the signal to arrive at the receiver. The reader perceives each copy of the signal as originating from a different direction, or angle of arrival. This phenomenon is referred to in the art of RFID technology as "multipath."

Multipath can cause undesired interference and ghosting. If the different copies of the signals overlap temporally, they may interfere with each other. Destructive interference causes fading. If the different copies of the signals do not overlap with each other, subsequent copies can appear as "ghosts." These ghosts may deceive the receiver into determining that extra RFID tags are present.

SUMMARY

Embodiments of the present technology include methods and systems for locating radio-frequency identification (RFID) tags. One example includes using a system with one or more antennas or RFID tag readers to receive, from a first RFID tag at a first unknown location, a plurality of first RFID signals. A processor coupled to the antenna(s) designates the first RFID tag as a first virtual reference tag based on the plurality of first RFID signals. The antenna receives at least one second RFID signal from a second RFID tag at a second unknown location. And the processor determines a position of the first RFID tag with respect to the first virtual reference tag based on the at least one second RFID signal.

Another example of the present technology uses a first antenna receive a first line-of-sight (LOS) signal from an RFID tag. A processor coupled to the first antenna estimates a first angle-of-arrival, a first phase difference, and a first frequency difference of the first LOS signal and determines a change in the first phase difference with respect to the first frequency difference. A second antenna receives a second line-of-sight (LOS) signal from the RFID tag. The processor estimates a second angle-of-arrival, a second phase difference, and a second frequency difference of the second LOS signal and determines a change in the second phase difference with respect to the second frequency difference. Then the processor estimates a location of the RFID tag based on the first angle-of-arrival, the change in the first phase difference with respect to the first frequency difference, the second angle-of-arrival, and the change in the second phase difference with respect to the second frequency difference.

Yet another example involves receiving, with a plurality of antennas, at least one RFID signal from at least one reference RFID tag. A processor operably coupled to the antennas determines an estimated location of the reference RFID tag based on the RFID signal. It performs a comparison of the estimated location of the reference RFID tag to an actual location of the reference RFID tag. The processor is calibrated based on the comparison of the estimated location of the reference RFID tag to the actual location of the reference RFID tag. The antennas receives at least one RFID signal from an RFID tag at an unknown location. And the processor determines an estimated location of the RFID tag based on the RFID signal.

Still another example includes receiving, with a plurality of antennas, reference RFID signals from respective reference RFID tags that are at respective known locations. The antennas also receive at least one RFID signal from an RFID tag at an unknown location. A processor coupled to the antennas determine a location of the RFID tag based on the RFID signal and the reference RFID signals.

Still yet another example includes using an antenna array to receive a reference RFID signal from at least one reference RFID tag. A processor determines a receptivity pattern of the antenna array based on the reference RFID signal. The antenna array receives an RFID signal from an RFID tag in an unknown location, and the processor determines a location of the RFID tag based on the RFID signal and the receptivity pattern of the antenna array.

Another example of the present technology includes monitoring a RFID tag by receiving, with at least one antenna, a plurality of RFID signals from the RFID tag over a period of time. A processor coupled to the antenna estimates a plurality of possible trajectories of the RFID tag over the period of time based on the plurality of RFID signals. The processor then identifies a first trajectory in the plurality of possible trajectories as corresponding to a line-of-sight (LOS) path between the antenna and the RFID tag.

Another example method of locating an RFID tag includes receiving, with a plurality of antennas, a signal from an RFID tag. A processor generates a first digital representation of the response as detected by a first antenna in the plurality of antennas and a second digital representation of the response as detected by a second antenna in the plurality of antennas. The processor generates a plurality of sums of the first digital representation and the second digital representation. Each of these sums is at a relative phase difference representing a different angle of arrival for the signal from the RFID tag. The processor uses these sums to estimate a location of the RFID tag.

Embodiments of the present invention include apparatus, systems, and methods for locating radio-frequency identification (RFID) tags. In one example, a method of locating an RFID tag includes sensing, with a plurality of antennas, a signal from an RFID tag to the transmitter. One or more analog-to-digital converters (ADCs) generates a first digital representation of the response as detected by a first antenna in the plurality of antennas and a second digital representation of the response as detected by a second antenna in the plurality of antennas. A processor coupled to the ADC(s) generates plurality of sums of the first digital representation and the second digital representation. Each sum in the plurality of sums is at a relative phase difference representing a different angle of arrival for the signal from the RFID tag. The method also includes estimating a location of the RFID tag based on the plurality of sums.

All combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. The terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 1A shows an example system for locating a radio-frequency identification (RFID) tag in an environment with both line-of-sight (LOS) and non-line-of-sight (NLOS) paths between the RFID tag and the receivers.

FIG. 2 is a block diagram of transmitters and receivers suitable for use in the systems of FIG. 1A.

FIG. 3B illustrates locating an RFID tag using virtual reference RFID tags, reference RFID tags, and measurements with multiple readers from different AOAs.

FIG. 8 shows how the GUI can display real-time and/or historical motion of an RFID tag in a store, stockroom, warehouse, or other environment monitored by an RFID tag location system.

FIGS. 9A-9D show how the GUI can be used to plan and track a pick path, e.g., in a stockroom or warehouse, for pulling items from a pick list based on RFID tag location data.

DETAILED DESCRIPTION

Figure 1B:
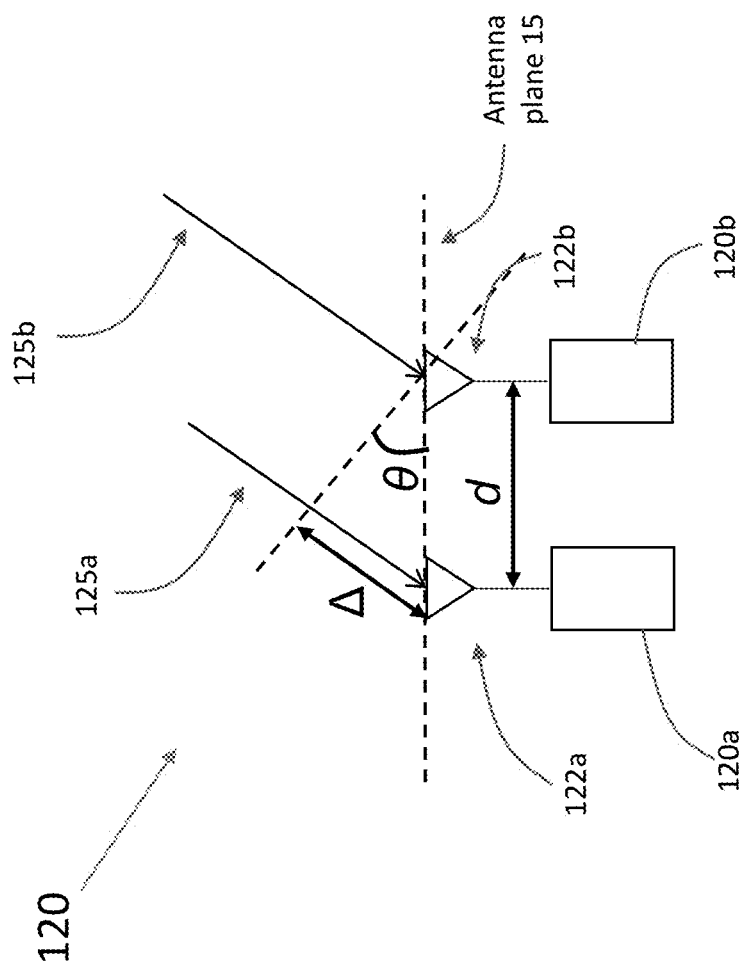
FIG. 1B shows an example system for estimating an angle of arrival (AOA) of an incident signal.

Until now RFID location technology hasn't lived up to the hype. Combined with computer vision technology, the inventive RFID location technology offers unprecedented speed and accuracy. In fact, it can be over 300 times more precise than conventional RFID location technology. For instance, the systems and methods disclosed below can be used to locate RFID tags to within 50 cm, 40 cm, 30 cm, 25 cm, 20 cm, 15 cm, 10 cm, 5 cm, or 2.5 cm of their actual locations. With this speed and accuracy, it can be used to track RFID-tagged items in real-time, down to the slightest movement. This level of speed and precision makes it possible to find and restock items nearly instantly and to track interactions among RFID tags. For RFID tags on products in a store, this yields data about customer interactions with products on an item-by-item level and enables autonomous checkout.

Except where physically incompatible, all of the techniques disclosed herein can be used with each other. For instance, an RFID tag location system can used multiple RFID tag readers to interrogate reference tags, virtual reference tags, and RFID tags from many angles of arrival and create (multipath) signatures based on the received signals. Such a system can locate the tags in two or three dimensions with respect to each other and/or absolute (known) locations. The resulting locations can be correlated with video data for training neural networks or managing operations of a store or warehouse. The location information can also be displayed on a smartphone, tablet, or other device for inventory and supply chain management, etc., as described in greater detail below.

1 Multipath and RFID Signals

To address the multipath issues in known radio frequency identification (RFID) technologies and accurately locate an RFID tag, systems, methods, and apparatus described herein employ an array of antennas to distinguish RF signals travelling along line-of-sight (LOS) paths from RF signals travelling along non-line-of-sight (NLOS) paths. The distance between adjacent antennas in the array of antennas may be less than half the wavelength of the radio frequency (RF) signal of the system. Each antenna in the antenna array is also digitally controlled to change its relative phase difference with respect to the other antennas in the antenna array. Each distinct phase setting of the antenna array corresponds to a distinct angle of arrival (AOA) measured by the antenna array. As long as the array comprises three or more antennas, this enables the antenna array to be digitally steered across elevation AOAs between 0 and 71 (i.e., between 0 and 180 degrees) and azimuth AOAs between 0 and 271 (i.e., between 0 and 360 degrees).

The digital steering, in turn, makes it possible to generate a plot or other representation of signal amplitudes as a function of AOAs. LOS paths are distinguished from NLOS paths based on the local extremes (e.g., maxima or minima) in the plot. For instance, the highest (lower), steepest maxima (minima) may be at the AOA corresponding to the LOS path. Triangulating with the AOAs for two or more distinct LOS paths yields the RFID tag's location in three dimensions (3D). Theoretically, this approach can locate items to perfect precision under perfect environmental conditions. Under realistic indoor conditions, the location accuracy may be better than 50 cm using this technique.

The LOS paths estimated above can be used to determine the location of an RF tag via triangulation. A first antenna or group of antennas is used to estimate a first LOS path to the RF tag and a second antenna or group of antennas is used to estimate a second LOS path to the same RF tag. Triangulating among the two LOS paths then provides an estimate of the RF tag's location in 3D.

The approach described above takes advantage of digital steering of the antenna array and can be cost effective in practice. In addition, the approach can be conveniently scaled up to multiple antenna arrays. These antenna arrays can be distributed in a given space (e.g., on the ceiling of a store or warehouse) to ensure at least two antenna arrays have a LOS path with an RFID tag in the space. This can be particularly advantageous in an indoor environment where there might be multiple obstructions. Examples of indoor applications of this RFID approach include retail stores, libraries, and warehouses, among others (see more details below).

Digital steering can also be used to locate other RF transceivers, including those found in smartphones, wearables, tablets, laptops, and other portable electronic devices with WiFi, Bluetooth, or similar antennas. As with the RFID tag location described briefly above and in greater detail below, a transmitter transmits a trigger signal to a device with a WiFi, Bluetooth, or other RF transceiver. In response to this trigger, signal the device emits a response that is detected by two or more receivers via LOS and/or NLOS paths. A processor coupled to the receivers steers the receivers' receptivity patterns by digitally steering the AOA for different combinations of receivers (e.g., pairwise combinations of receiver) and looking for the strongest signal(s) as a function of AOA.

2 Systems for Distinguishing LOS and NLOS Paths

FIG. 1A shows a system 100 for distinguishing LOS paths 11 from NLOS paths 13 to a device or item with an RF transceiver, such as an RFID tag 10, smartphone, wearable computing device, tablet, or laptop. The system 100 includes an RFID reader (transmitter) 110 and two receivers 120*a* and 120*b* (collectively referred to as receivers 120, also referred to as receiver antennas 120). The reader 110 and the receivers 120 are coupled to a processor 130. Two receivers 120 are shown in FIG. 1A for illustrative purposes. In practice, the system 100 can include more than two receivers 120. These receivers 120 can be disposed in a one-dimensional (1D) or two-dimensional (2D) array. In another example, the receivers 120 are dispersed randomly or irregularly in a given space.

The receivers 120 can form (part of) a phased antenna array. In this case, the distance d between the two receivers 120*a* and 120*b* is substantially equal to or less than half of the carrier wavelength λ of the radio-frequency (RF) signal used to interrogate the RFID tag 10, i.e., d≤λ/2. The system 100 can be configured to operate at any one of various carrier wavelengths (accordingly various carrier frequencies).

For example, the system 100 can use RF signals in the ultra-high frequency (UHF) region of the electromagnetic spectrum (e.g., about 850 MHz to about 960 MHz) or microwave signals (e.g., 2.45 GHz). The corresponding carrier wavelengths are about 31 cm to about 35 cm for UHF signals and about 12.2 cm for microwave signals. In this case, the distance d between the two receivers 120*a* and 120*b* can be substantially equal to or less than 17.5 cm at UHF frequencies or less than 6.1 cm at microwave frequencies. In other applications, such as outdoor applications, the system may operate at lower frequencies (e.g., 13.56 MHz, 125 kHz, etc.) with correspondingly longer wavelengths (e.g., 22 meters, 2400 meters, etc.). For locating WiFi or Bluetooth devices, the system may operate in the unlicensed Industrial, Scientific, and Medical (ISM) band at 2.0 GHz to 2.4 GHz or at any other suitable band (e.g., 5 GHz). Higher frequencies (shorter wavelengths) generally provide more precise location estimates than lower frequencies (longer wavelengths).

The two receivers 120*a* and 120*b* include antennas 122*a* and 122*b* (collectively referred to as receiver antennas 122), respectively, to receive the RF signal(s). The receiver antennas 122 can be controlled digitally to change the phase difference of the signals that they receive from the RFID tag 10. This digital control can allow convenient steering of the two antennas 122 toward different angle of arrivals (AOAs).

In one example, the reader 110 and the receivers 120 can be disposed into a single enclosure to form an integrated device. The processor 130 can also be integrated into the device. In another example, the reader 110, the receivers 120, and the processor 130, can be distributed at different locations. For example, the receivers 120 can be placed at locations that have a clear field of view of the space to be monitored for the tag 10 (e.g., on the ceiling of a room), while the processor 130 is placed at locations with better human access (e.g., in a control room). The readers 120 can be connected to the processor 130 via one or more wired connections or over a wireless link (e.g., a WiFi link).

In operation, the reader 110 emits an RF signal towards the RFID tag 10. In one example, the reader 110 transmits the RF signal throughout a given space, such as a room. In another example, the reader 110 emits the RF signal with a smaller divergence and steers or sweeps the RF signal across the space. In either case, if the RFID tag 10 is within the given space, the RFID tag 10 can emit a response signal as understood in the art of RFID tags.

Depending on the position of the RFID tag 10 and the receivers 120, the response signal may propagate directly from the RFID tag 10 to the receivers 120 along the LOS path 11 without being reflected or scattered. The response signal may also propagate in other directions as well. For example, the response signal may be reflected or scattered off a wall 12 (or any other obstructions distributed throughout the given space). In this case, the response signal arrives at the receivers 120 along the one or more NLOS paths 13. As described above, this can cause multipath issues and compromise the accuracy and reliability of the system 100.

The system 100 shown in FIG. 1 can distinguish signals along the LOS path 11 from signals along the NLOS paths 13 based on their respective angles of arrival (AOA). The distinction can be made by determining the angles of arrival that correspond to extrema (e.g., local maxima and minima) in the antennas' receptivity pattern. For example, the system processor 130 can coherently sum the signals received by adjacent antennas 122 at each of several phase differences, each of which corresponds to a different AOA. The coherent sums that produce maxima correspond to the AOAs from which the LOS signals and NLOS signals arrive. Absent attenuation, the tallest and steepest maximum generally corresponds to the LOS path 11, with other maxima corresponding to AOAs for the NLOS path(s) 13.

FIG. 1B shows the receivers 120 used to estimate AOAs θ based on the phase difference in the signals received by the two antennas 122a and 122b. The RF signals 125a and 125b arriving at the two antennas 122a and 122b, respectively, can be regarded as substantially parallel to each other provided that the distance d is small enough compared to the distance between the receivers 120 and the RFID tag 10 (d<λ/2). In this case, the signals 125a and 125b have the same AOA θ with respect to an antenna plane 15 defined by the two antennas 122a and 122b. Without being bound by any particular theory or mode of operation, the phase difference Δφ between the two signals 125a and 125b, as detected by the two antennas 122a and 122b, respectively, can be written as:

$$\Delta\varphi = \frac{2\pi\Delta}{\lambda} = \frac{2\pi d}{\lambda}\sin(\theta) \quad (1)$$

where Δ is the length difference between the two paths taken by the two signals 125a and 125b. Once the phase difference is determined, the AOA θ can be calculated according to Equation (1).

Equation (1) also represents digital steering of the antennas 122 toward different AOAs θ. In this case, the phase difference Δφ between the two antennas 122a and 122b can be adjusted by, for example, applying a digital delay to one or both antennas 122a and 122b. This digital delay offsets the propagation delay Δ shown in FIG. 1B. Once the phase difference Δφ changes, the AOA θ changes accordingly, which means that the antennas 122a and 122b are steered toward a different AOA θ to receive the signals 125a and 125b.

The phase difference Δφ can be changed across a range such that the corresponding AOA θ changes from 0 to π. At each AOA θ, a corresponding signal amplitude can be recorded. The signal amplitude can be a coherent sum of the signals detected by the two antennas 122a and 122b. Upon completion of the scanning of AOAs θ, a plot can be generated to show the signal amplitude as a function of AOAs θ and find out the LOS path 11 (see, e.g., FIG. 1C and the description below).

In the system 100, the processor 130 can be used to control the scanning of the AOA θ by controlling the amount of delay applied on the antennas 122. The step size of the scanning Δθ can be about π/1000 to about π/10 (e.g., about π/1000, about π/500, about π/200, about π/100, about π/50, about π/20, or about π/10, including any values and sub ranges in between).

The processor 130 can also exploit estimated, known, or measured symmetry to reduce scanning and/or processing time. For instance, the processor 130 may select and digitally calculate the phase difference Δφ to steer the antennas 122 at symmetric angles (e.g., +45°) instead of asymmetric angles (e.g., −45° and +44°). Because the angles are symmetric, they produce anti-symmetric results (e.g., results with only a sign difference) and can therefore be calculated in about half the time as asymmetric angles.

In addition, the knowledge of the antenna pattern can also be used to reduce the number of angles that need to be computed for given measurement precision. For example, the sensitivity of the antennas 122 may change rapidly around certain angles. At or near these angles, the step size of the scanning Δθ can be reduced to sample more AOAs and produce acquire more precise results. In contrast, at angles where the sensitivity of the antennas 122 stays relatively constant, the step size of the scanning Δθ can be increased to sample less, thereby reduce scanning time and processing time.

Figure 1C:
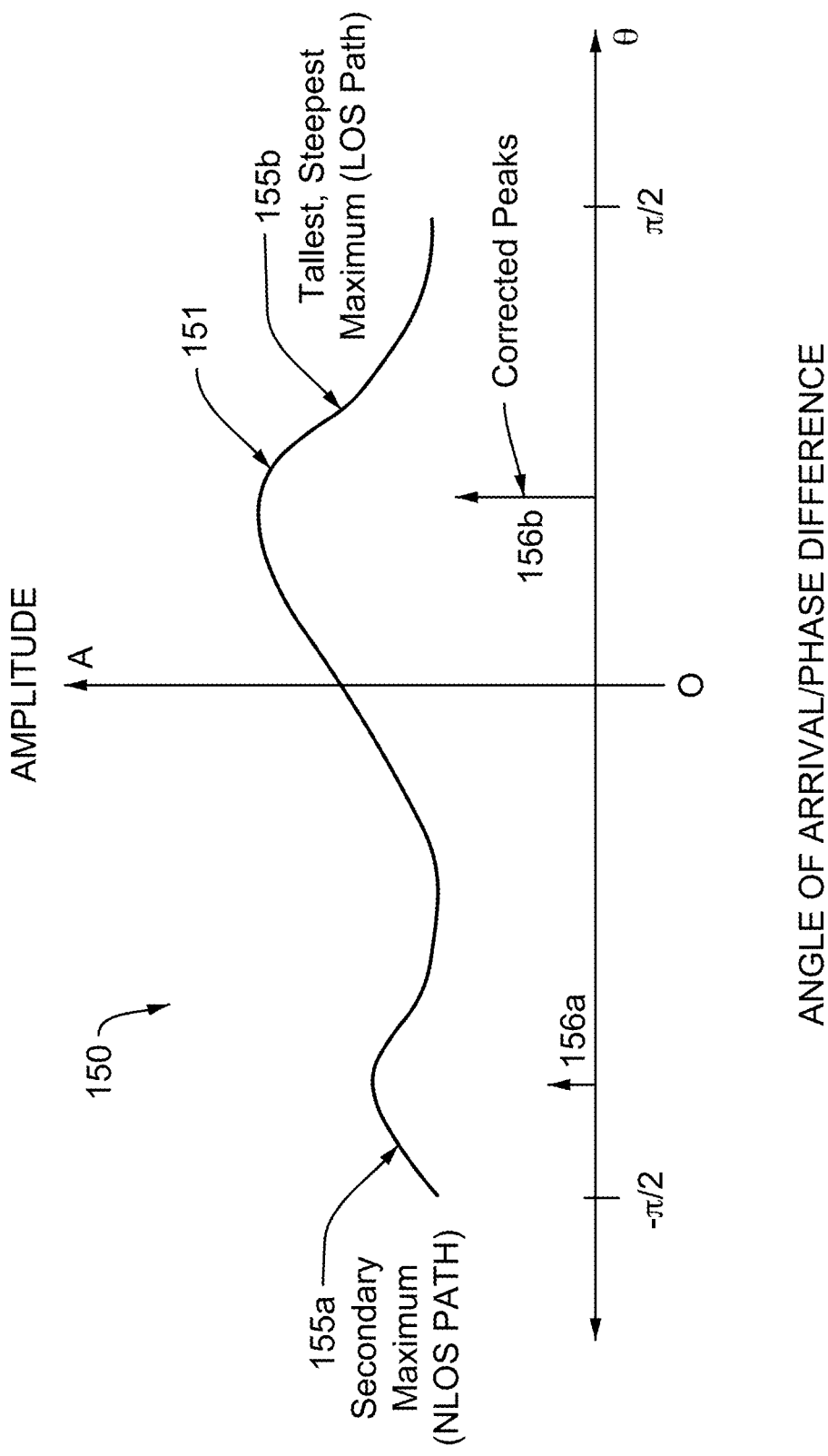
FIG. 1C is a plot showing an example of a composite signal amplitude versus angle of arrival/phase difference before (solid trace) and after (rays) de-convolution, or other correction, with the antenna receptivity pattern.

FIG. 1C shows a plot 150 of notional signal amplitudes A versus AOA θ, i.e., A(θ), for RFID signals received by a pair of antennas 122 like those shown in FIG. 1A. The upper trace 151 represents the composite signal formed by digitally incrementing the phase difference between the signals received by the antennas. In this case, the composite signal includes a first maximum 155a close to −3π/8 and a second maximum 155b close to +π/4. The second maximum 155b is relatively tall and narrow (steep), whereas the first maximum 155a is relatively short and wide. In this case, the tall and narrow second maximum 155b corresponds to a signal that arrives at the receivers along an LOS path (e.g., path 11), whereas the wide and short first maximum 155a corresponds to a signal that arrives at the receivers along an NLOS path (e.g., path 13).

The processor 130 can be further used to correct for the antenna receptivity pattern S(θ) from the signal amplitude A, thereby yielding the rays 152 shown along the horizontal axis. This correction can simplify identification of the angles of arrival corresponding to LOS and NLOS paths between the antennas and the RFID tag(s). Without being bound by any particular theory of mode of operation, this correction may be done by calibrating the antenna design and dividing out the calibrated gain pattern or by effectively de-convolving the calibration pattern from the measured signal amplitude $A_{measured}$ (curve 151) since the measured signal is essentially a convolution of the true signal $A_{true}$ amplitude convolved with the antenna receptivity pattern S(θ):

$$A_{measured}(\theta) = A_{true}(\theta) \otimes S(\theta) \quad (2)$$

This de-convolution can be used to recover the true signal amplitude as a function of AOA θ.

The antenna receptivity pattern S(θ) can be measured using a reference antenna with a known emission pattern (e.g., $A_{true}$). With this reference antenna as an illumination source, $A_{measured}$ can be recorded. Then the receptivity pattern S(θ) can be calculated according to Equation (2).

After de-convolution, or other correction, the amplitude curve 151 is converted into two peaks 156a and 156b. The higher peak 156b corresponds to the LOS path and the smaller peak 156a corresponds to an NLOS path between the antennas and the RFID tag. If desired, the processor may fit curves (e.g., Lorentzians or Gaussians) to the peaks 156 in order to generate a more precise estimate of the AOAs for the LOS and NLOS paths.

3 Estimating the Location of an RFID Tag

Based on the AOAs of LOS paths, the processor 130 can estimate the position of the RFID tag 10 using triangulation. Two or more groups of antenna arrays can be used. For example, a first antenna array, such as the two antennas 122, is used to identify a first LOS path between the RFID tag 10 and the first antenna array. A second antenna array (not shown) is used to identify a second LOS path between the RFID tag 10 and the second antenna array. The location where the two LOS paths cross each other (or where the error between them is minimized) is the likely location of the RFID tag 10 in the plane of the LOS paths to the first and second antenna arrays.

If desired, the processor may estimate the distance between each antenna and the RFID tag based on the amplitude or the received signal strength indication (RSSI) of each LOS signal or based on slope of the difference in phase over difference in frequency. With two or more distance estimates, the processor can trilaterate the RFID tag's location in addition to or instead of triangulating based on the AOAs. These distance estimates may be used to estimate the RFID tag's location more precisely or uniquely without AOAs.

The slope of the difference in phase over difference in frequency refers to a technique regularly used in radar and radar-like systems where the phase of the received signal is directly compared to the phase of the transmitted signal. For an item (tag in this case) that is a given distance from the reader, this phase offset should vary in a predictable way by its carrier frequency. So capturing this relative phase offset, φ, at multiple carrier frequencies, f, allows estimation of the distance from the reader to be:

$$d = \frac{d\phi}{df} c$$

where c is the speed of light.

4 Training and Operating an RFID Tag Location System

An RFID tag location system may undergo a training phase before becoming operational. In this training phase, the RFID tag location system estimates the locations of reference RFID tags or other transceivers at known locations. The system calibrates itself by comparing the reference RFID tags' estimated locations to their actual locations. Once training is complete, the system can locate unknown RFID tags, smartphones, and/or other devices. The system may repeat training periodically (e.g., at night, on the weekends, etc.) or as desired (e.g., in response to user commands).

To see how an example system (e.g., the system of FIG. 1A) determines LOS and NLOS paths and estimates, consider a reader that emits a continuous-wave (cw) RF interrogation signal at a wavelength of λ. In a first (training) phase, the reader interrogates a set of tags whose locations are known. These tags are called reference tags. Each reference tag receives this interrogation signal and emits a signal in response that is received in turn by each of k=1 ... K antennas, each of which is located along a line segment of length D where $x_k$=kD/(K−1) is the lateral position of the kth antenna. (Other antenna arrangements are also possible). Each antenna in the array detects the tag's output and emits a complex baseband signal $s_k$ representing the tag's output.

If there is no multipath, each antenna's expected spatial response for a tag at an angle of arrival θ is:

$$w(k, \theta) = \exp\left(-j\frac{2\pi}{\lambda} x_k \cos\theta\right) \quad (3)$$

(It is not necessary to account for gain because the system is not a beamforming system.) The power received across the entire antenna array in the θ direction can be computed as:

$$B(\theta) = \left|\sum_{k=0}^{K-1} w(k, \theta) \cdot s_k\right|^2 \quad (4)$$

B(θ) is also referred to as the multipath profile of an antenna array since it (i.e., B(θ)) takes into account incident power from signals along both the LOS and NLOS paths. The system measures the multipath profile of the antenna array at each of several AOAs for all of the reference tags and for one or more readers. Once the processor has determined the AOA for LOS paths between the antennas and the reference tags, the processor can compute the reference tags' locations using triangulation and/or trilateration as described above.

The above technique can be extended to a 2D (or even 3D) antenna array topology. For example, for a simple 2D array in a 2×2 uniform rectangular array, assuming isotropic elements on the xy-plane, the steering vector is given by:

$$a(\theta, \phi) = \exp\left[j\frac{2\pi}{\lambda}\cos(\theta)(p_x\cos(\phi) + p_y\sin(\phi))\right]$$

where the position vectors, $p_x$ and $p_y$ are given by.

$$p_x = \frac{d}{2}\begin{bmatrix} -1 \\ -1 \\ 1 \\ 1 \end{bmatrix} \text{ and } p_y = \frac{d}{2}\begin{bmatrix} 1 \\ -1 \\ 1 \\ -1 \end{bmatrix}$$

with d denoting the element spacing between the array rows and columns.

The power received at each 3D angle (θ, φ), and thus the 3D multipath profile, is calculated by:

$$B(\theta, \phi) = |a^H(\theta, \phi) \cdot s|^2 = \left|\sum_{k=0}^{K-1} a^*(k, \theta, \phi) \cdot s_k\right|^2$$

Figure 1D:
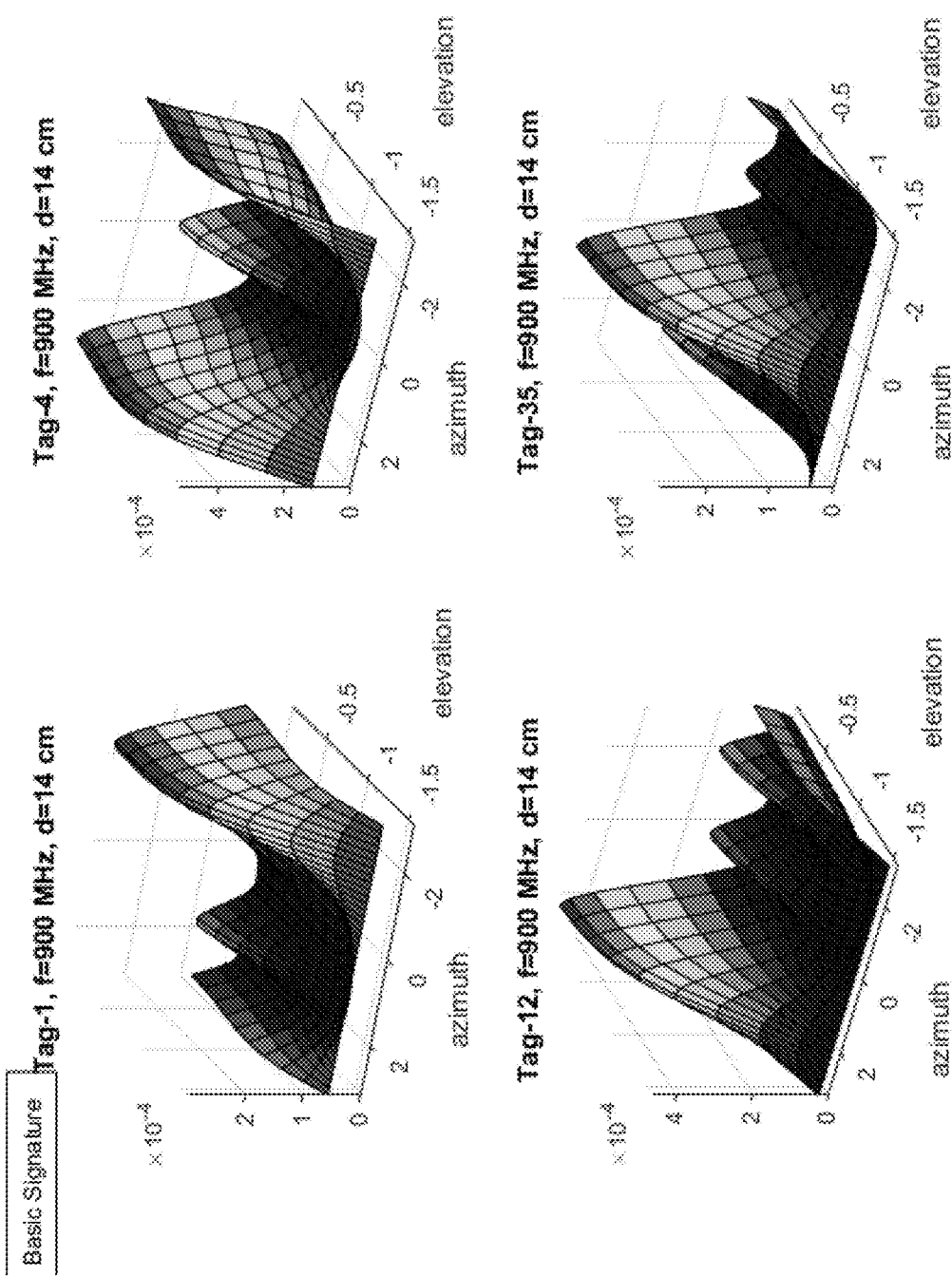
FIG. 1D shows plots of RFID tag signal amplitudes versus angle and elevation for four different RFID tags, each of which is at a different AOA with respect to the antenna.

FIG. 1D shows measured 3D multipath signatures for RFID tags at different locations and angles of arrival with respect to a common receiver (antenna). Each plot shows the RFID tag signal amplitude versus azimuth and elevation angles. The peaks represent LOS and NLOS paths between the tags and the antenna, with the tallest, steepest peak in each plot representing the LOS path. These multipath signatures can be compared with each other to determine the relative AOAs and locations of the RFID tags as described in greater detail below.

After the system has completed training (it has measured the multipath profile for all of the desired angles of arrival), it enters a second (operational) phase performed in the environment (or a duplicate environment). In the operational phase, the system interrogates non-reference tags (i.e., tags whose locations are unknown) and computes the multipath profile for each unknown tag/reader combination. The system compares the multipath profile for each unknown tag to the multipath profile(s) for the reference tags to determine the unknown tag's location.

The system may estimate the unknown tag's location by taking a weighted sum of three or more reference tag locations where the weights depend on distances between the corresponding multipath profiles. For instance, the location of a reference tag whose multipath profile more closely matches the multipath profile of the unknown tag may be weighted more heavily than the location of another reference tag. The exact weighting can be determined using a suitable distance metric, such as Euclidean distance, or "metric learning," which leverages locations of both reference tags and estimated locations of other unknown tags. Alternatively or in addition, the system may cluster reference tags and unknown tags according to a property (e.g., multipath profile) and define a representative example of that property for use in weighting.

The system may repeat the training phase, e.g., periodically, to account for changes in environment, such as changes in the number and locations of the reference tags and changes in the number, type, and locations of obstructions responsible for multipath effects. The system may also be tested in a third (post-training) phase, in which an unknown tag is moved through a series of known locations within the environment, e.g., using a drone or robot. As in the operational phase, the system measures the unknown tag's location and compares that measured location to the robot or drone's coordinates for determining the optimal distance metric (metric learning) for weighting the reference tag locations.

In some cases, instead of calculating the solution (e.g., AOA and LOS path) from one antenna array and then overlaying with another solution from another antenna array, the raw data from both arrays can be acquired to generate a single composite solution. This can yield multiple solutions for arrays spaced farther than λ/2. Aliased solutions can be ruled out by checking the plausibility of the resulting location estimates.

5 Transmitters and Receivers for LOS and NLOS Determination

FIG. 2 shows an RFID system 200 including multiple readers 210a-210n (collectively, RFID readers 210) and multiple receivers 220a-220n (collectively, receivers 220). The RFID system 200 also includes a processor 230, a common local oscillator (LO) 240, and analog front ends 250a-250n (collectively, front ends 250). Each reader 210 is grouped with a corresponding receiver 220 and a corresponding front end 250, as shown in FIG. 2. Other arrangements of the readers 210, the receivers 220, and the front ends 250 are also possible. For example, more than one receiver 220 and/or more than one front end 250 can share a common reader 210.

Each reader 210 includes a corresponding digital-to-analog converter (DAC) 218. The input of the DAC 218 is coupled to the processor 230 and the output of the DAC 218 is coupled to a low-pass filter 216. In operation, the DAC 218 generates an analog representation of a digital RFID tag interrogation signal generated by the processor 230. The filter 216 removes high-frequency spurs and noise from the analog RFID tag interrogation signal. The output of the filter 216 is coupled to the intermediate-frequency (IF) input of a mixer 214. The LO input of the mixer 214 is coupled to the LO 240. The mixer 214 mixes the analog RFID tag interrogation signal with a high-frequency (e.g., 902-928 MHz) carrier from the LO 240 to produce an RF output, which is coupled to a power amplifier 212. The power amplifier 212 amplifies the RF output and couples it to a circulator 256, which transmits the amplified RF output to an antenna 252a via a bandpass filter 254a. The antenna 225a can be any suitable single antenna element. The circulator 256 substantially prevents the amplified RF output from propagating to or through the receiver 220. The antenna 252 transmits the amplified RF output to the RFID tag, which responds with an analog response signal of its own.

The antenna 252 receives response signals from the RFID tag and couples them to the bandpass filter 254, which filters the response signal and couples it the circulator 256. The circulator 256, in turn, couples all or substantially all of the response signal to a low-noise amplifier (LNA) 222. The LNA 222 boosts the amplitude of the response signal and couples it to a mixer 224, which mixes the response signal with the LO to produce a down-converted RFID signal. A low-pass filter 226 removes high-frequency noise and spurs from the down-converted RFID signal, which is digitized by an analog-to-digital converter (ADC) 228 and fed to the processor 230.

The antennas 252 shown in FIG. 2 form an antenna array with a fixed or known phase difference between pairs of adjacent antennas 252. The components and connections between components in the receivers 220 and front ends 250 may be calibrated, tuned, lengthened, or trimmed to provide known and stable phase relationships between the signals received by nearest neighbor antennas 252. For example, at least one antenna in each pair of adjacent antennas may be coupled to a phase tuner (not shown) to set or adjust the phase relationship between the adjacent antennas 252. The relative phase relationship between adjacent antennas 252 can also be measured and calibrated digitally using the processor (e.g., the processor 230 or a different processor not shown in FIG. 2). Maintaining fixed phase relationships between adjacent antennas 252 allows digital steering of the antennas' receptivity pattern by digitally adjusting the phase difference between the signals.

The system architecture shown in FIG. 2 can be used for locating any wireless system, including Bluetooth and WiFi; it would just operate at different frequencies. A system that locates RFID, Bluetooth, and/or WiFi devices may include multiple copies of the components shown in FIG. 2, with each copy for each type of device and operating in a different frequency band (e.g., 865-868 MHz or 902-928 MHz for RFID, 2400-2835.2 MHz for Bluetooth, and 2.4 GHz or 5 GHz for WiFi).

6 Methods of Estimating RFID Tag Locations

Figure 3A:
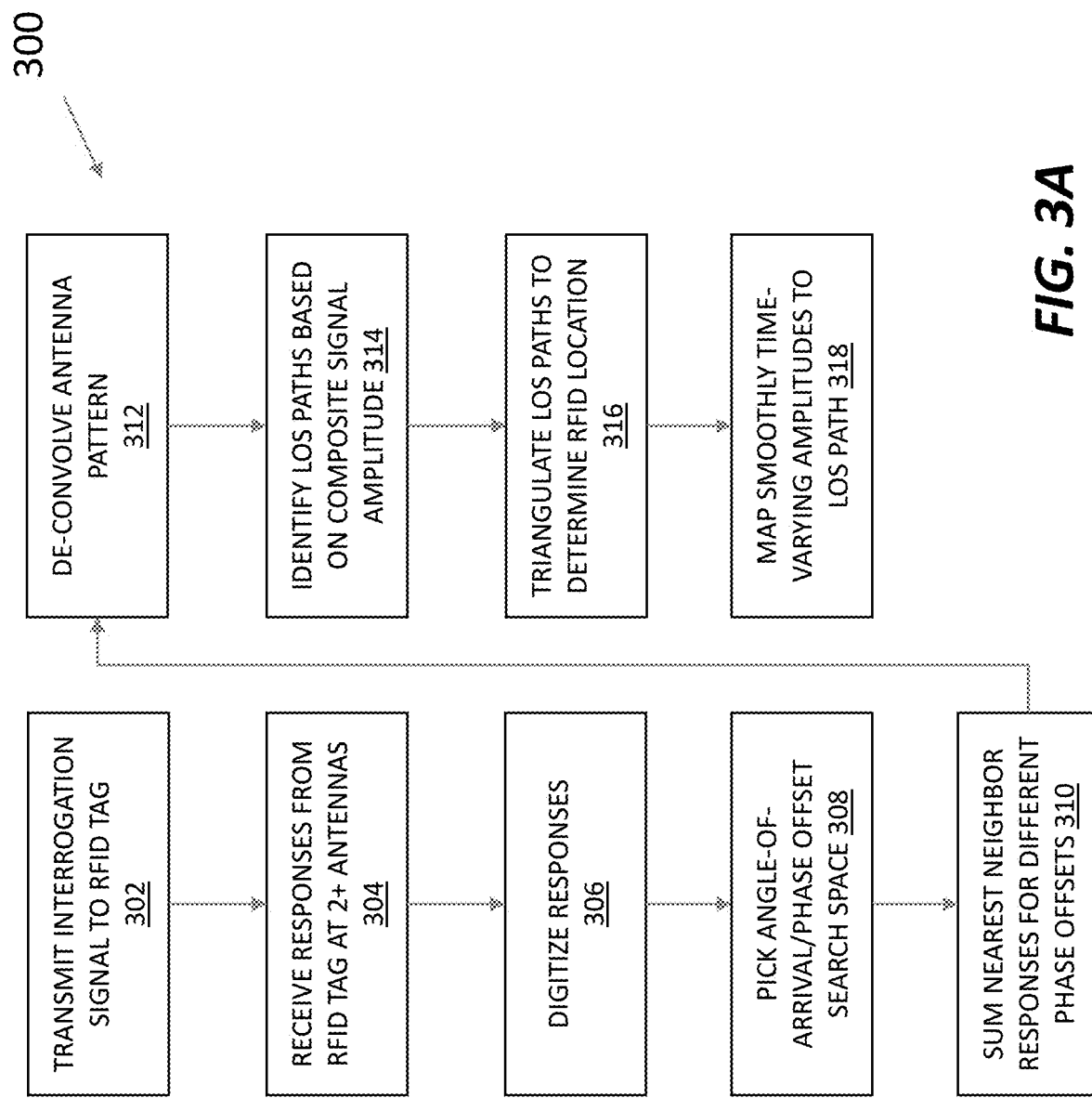
FIG. 3A is a flow diagram that illustrates a method of locating an RFID tag using a system like the one shown in FIG. 1A.
Figure 3C:
FIGS. 3C-3F are frames of a video showing the measured location of an RFID tag, indicated by a circle, and a bounding box drawn around an object tagged with the RFID tag using a neural network or other computer vision technique.
Figure 3D:
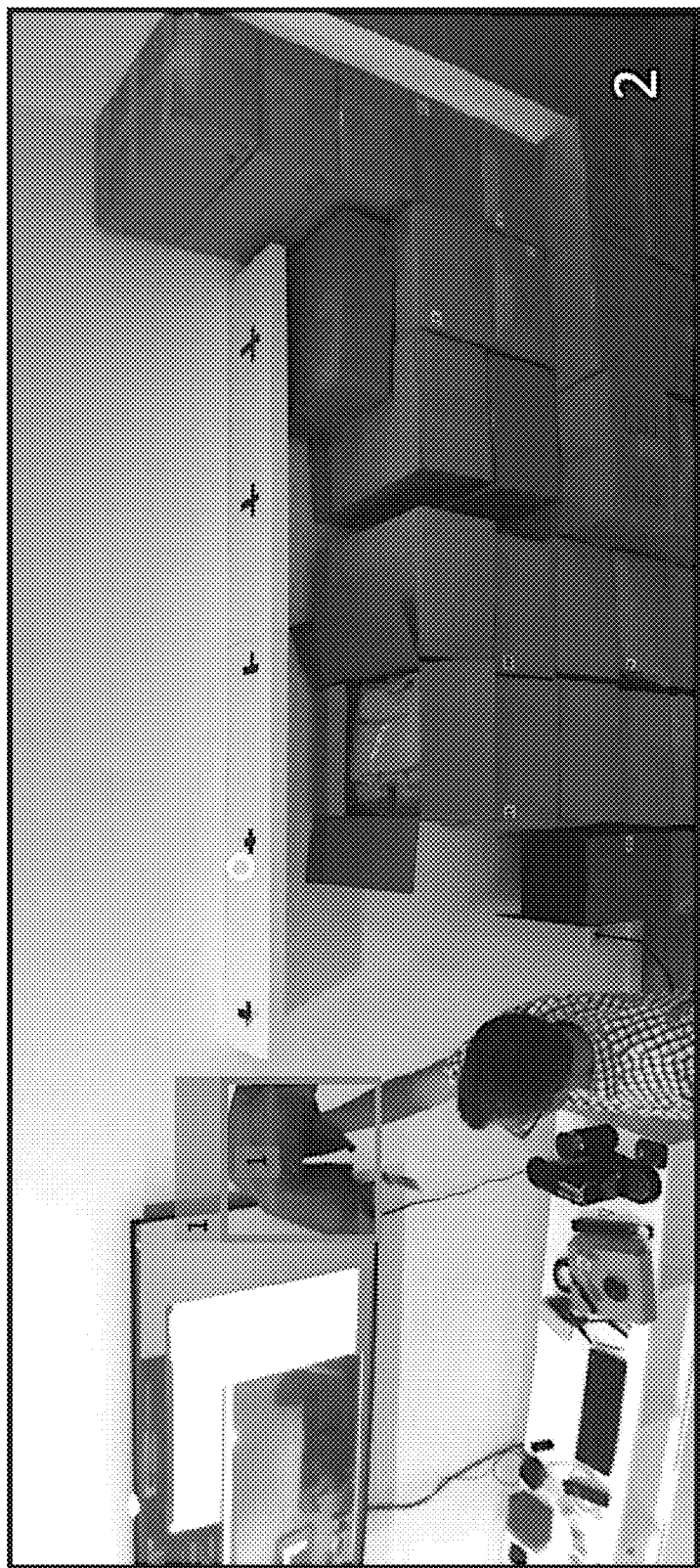
Figure 3E:
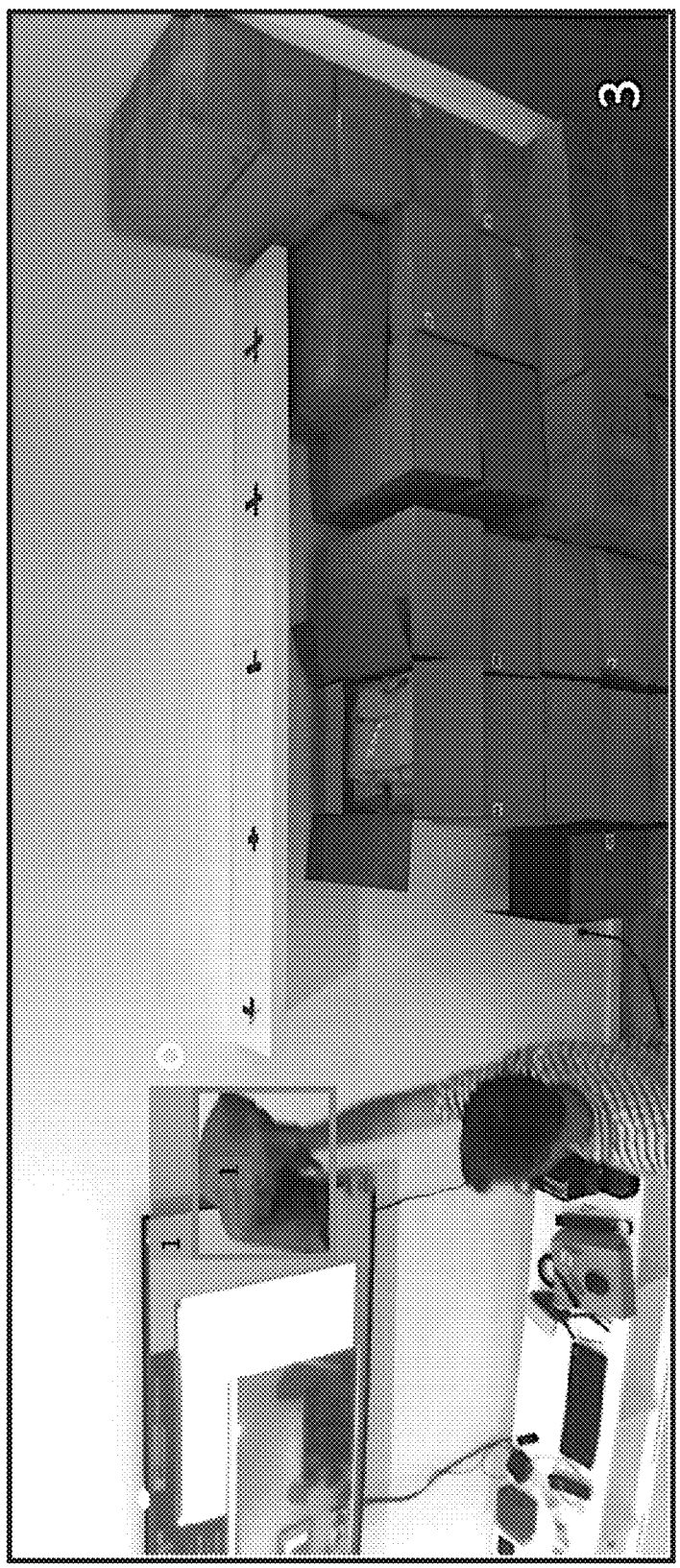
Figure 3F:
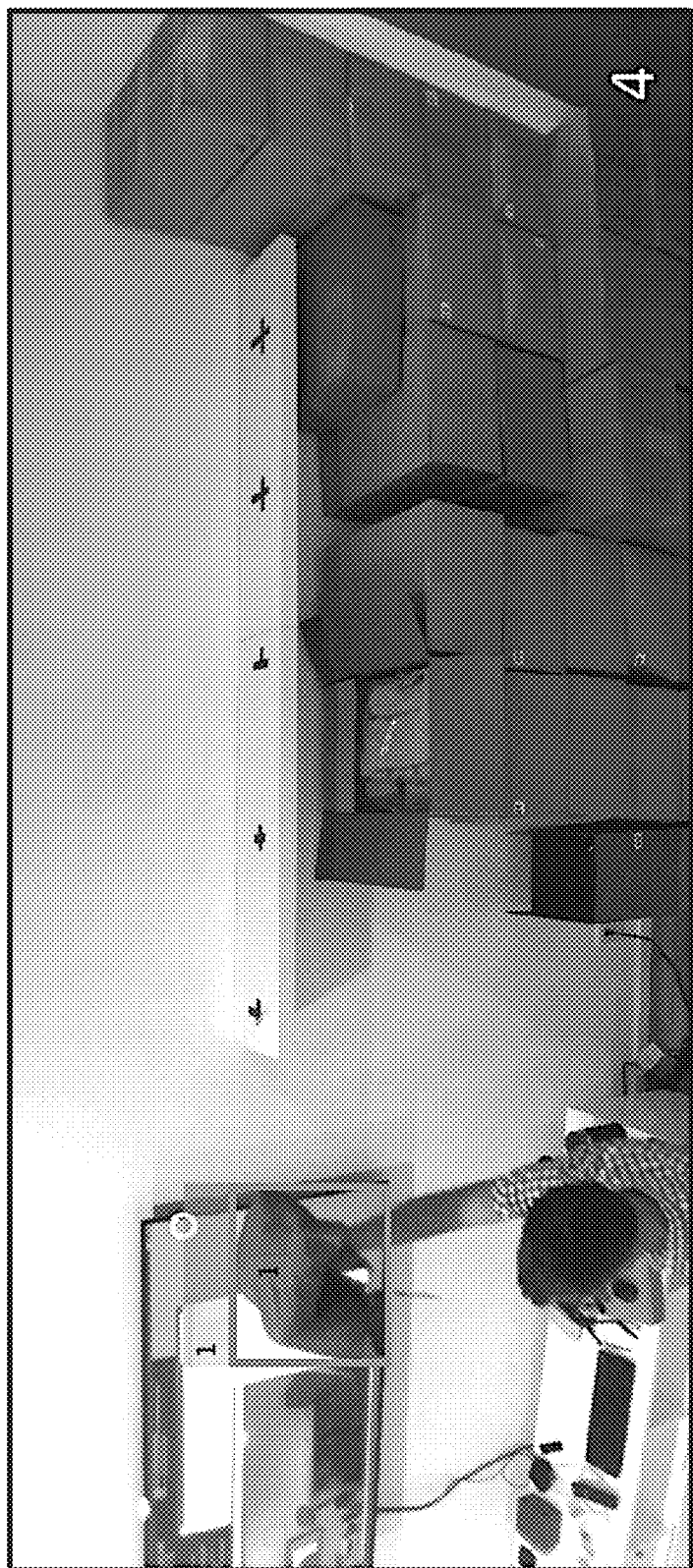

FIG. 3A illustrates a method 300 for estimating the location of an RFID tag, smartphone, or other device with an RF transceiver using a system like those shown in FIGS. 1A and 2. At step 302, a transmitter emits or transmits an RFID tag interrogation signal to one or more RFID tags within a volume of interest, such as a store, stockroom, warehouse, or other environment where RFID tags are used. (Step 302 may be omitted when locating a device with an active transmitter, such as a cellular, WiFi, or Bluetooth transmitter.) The RFID tags respond to the RFID tag interrogation signal by emitting analog RFID signals, referred to as response signals. Two or more antennas receive the response signals at step 304. One or more ADCs digitize the analog response signals at step 306. In addition, electronic components coupled to the antennas can also down-convert and filter the analog response signals to facilitate subsequent processing. The resulting digital RFID signals can be stored and processed in real time, post-processed, or both.

As described above, a processor coupled to the electronic components uses the digital RFID signals to identify the signals' AOAs with respect to the antennas. For example, the processor can electronically steer the antennas' receptivity pattern across one or more AOAs at step 308. In one example, the AOAs can be selected apriori. For example, a uniform step size (e.g., about $\pi/1000$ to about $\pi/10$) can be used to scan angles between 0 and $\pi$. Alternatively or in addition, the AOAs can be selected based on previous measurements to reduce processing time. For example, at angles where the sensitivities of the antennas change rapidly, the processor can use a smaller step size to take more samples. In addition, the processor can use information about the RFID tags and the environment (including symmetry considerations) to select AOAs that are more likely to yield a result in order to reduce processing time.

The processor can select likely AOAs based on principal component analysis (PCA) of previously received signals. For example, the antennas can monitor the movement of a specified RFID tag. Between successive acquisitions of the response signals by the antennas, the RFID tag may move by only a small amount $\Delta L$, which can be much less than the distance between the RFID tag and the antennas. In this case, the AOAs corresponding to stronger signals in these adjacent measurements may be substantially the same, so the AOAs estimated in previous measurement can be used in subsequent measurement.

Each candidate AOA corresponds to a particular phase offset (also referred to as the phase setting) as measured by the antennas. Thus, the processor can determine the signal strength for each AOA by digitally adjusting the phase difference between the digitized RIFD signals from two or more antennas with a known phase relationship (e.g., nearest neighbor antennas), then coherently summing the digitized RFID signals at step 310. This steers the antennas' receptivity pattern through each of the corresponding AOAs. It also yields the signal amplitudes and phases detected by the antennas as a function of AOA (phase difference between antennas). The steering generates a plot of the signal amplitude as a function of AOAs (e.g., see FIG. 1C).

At an optional step 312, the processor can de-convolve, or otherwise correct, the antenna pattern from the plot of the signal amplitude (see, e.g., peaks 152 in FIG. 1C). This facilitates the determination of LOS paths by examining the height of the peak. In general, the highest peak corresponds to the signal that travels along the LOS path. For a more precise estimate, the processor may fit a curve to the peak, e.g., using a polynomial or nonlinear regression, and estimate the AOA based on the coefficients used to reduce or minimize the error associated with the curve fit.

After the antenna pattern is de-convolved, or otherwise corrected, from the signal amplitude and phase, the processor may look for minima (valleys) instead of maxima (peaks). In this case, the processor may identify the LOS and NLOS paths based on the valley depths, valley widths, valley slopes, or some combination thereof. For example, the processor may identify the deepest, steepest valley in a representation of the signal amplitude versus AOA as corresponding to the AOA for the null along the LOS path to the RFID tag. Other valleys may correspond to angles for nulls of other NLOS paths to the RFID tag.

At step 314, the processor compares the amplitudes and phases at the AOA offsets to determine the angle of arrival that is most likely to represent the LOS channel for the RFID tag. The processor may identify the LOS and NLOS paths based on the heights of the maxima, the widths of the maxima, the slope (rate of change) of the signal amplitude versus AOA, curve fit coefficients, or a combination thereof. For example, the processor can look for the tallest, steepest maximum in a representation of the signal amplitude versus AOAs. This maximum represents the angle at which a peak in the antennas' receptivity pattern is pointed along the LOS path at the RFID tag. Other maxima may represent angles at which the peak is pointed along NLOS paths at the RFID tag.

In some cases, the processor correlates the response signal with an expected response from the RFID tag. This can be done, for example, at step 308 in the method 300. In this case, the system (e.g., of FIG. 1A) may construct or use a library of expected responses from the RFID tag. Each expected response corresponds to a distinct AOA. The processor compares the detected response signal with the expected responses to find the closest expected response. The AOA of the closest expected response is taken to be the AOA of the response signal. This technique is similar to matched filtering and can increase the signal-to-noise ratio (SNR) by up to 20 dB or more.

In optional step 316, the processor uses the different angles of arrival from different pairs of antennas to estimate the RFID tag's location in the environment. For example, the processor may triangulate the RFID tag's location in at least two dimensions (e.g., in a plane parallel to the floor) using two or more estimated angles of arrival in the same plane. If the antennas are located in different planes, the processor can estimate the RFID tag's location in 3D space based on three or more estimated angles of arrival in different planes.

If more than two antennas are used in step 304, and these antennas are not all co-linear, each RFID receiver can find an angle to the tag in 3D space. With this, in optional step 316, the location of the tag could be determined without the constraint of the antenna arrays being on different planes.

In another optional step 318, the processor may track changes in a tag's location over time. More specifically, it may map smoothly varying changes in the tag's location to a path in 2D or 3D space. To do this, the system measures the tag's location at many points in time, e.g., at a rate of once every second or every few seconds. It computes the tag's location at each point in time, then makes vector distance determinations between successive locations to determine the tag's velocity. The processor may classify the tag's velocity by speed and direction and determine, based on the speed and direction, the tag's likely trajectory and who is (likely to be) carrying or moving the RFID tag. For instance, if the tag is moving at a walking pace towards the exit, the system may determine that a customer is taking an item with the tag to the checkout or store exit. Alternatively, if the tag is moving quickly to or from a storeroom, the system may determine that an employee is stocking or shelving the item with the tag.

The system may also use measurements at many points in time to distinguish LOS signals from NLOS signals. If the system detects an LOS signal and one or more NLOS signals, each of which appears as a separate "ghost" tag, it may construct trajectories for each signal. The trajectory for the LOS signal should vary smoothly, whereas the trajectories for the NLOS signals may change direction sharply as the tag moves relative to antennas and the obstructions that scatter or reflect the NLOS signals. More specifically, the processor may use time-varying measurements of LOS and NLOS signals to generate the principal vectors of the tag's trajectory. The vectors that solve for a smooth trajectory are likely to be LOS and the vectors that solve for a rough trajectory or an impossible trajectory (e.g., due to some given or predefined maximum velocity of a human) are thrown out as multipath (NLOS) rays.

In a system with multiple pairs of antennas (i.e., three or more antennas), the processor may perform steps 302, 304, 306, 308, 310, 312, and 314 for different combinations of readers and antenna pairs to derive additional LOS and NLOS path information for one or more of the RFID tags in the environment. With a single reader and three or more antennas, for instance, the processor can compute the angle of arrival for the LOS path to each pair of adjacent antennas. If the midpoints of the line segments connecting the different pairs of antennas are at different locations, each pair of antennas can have an LOS path to the RFID tag with a different angle of arrival.

The processor can also perform steps 302, 304, 306, 308, 310, 312, and 314 for combinations of a single pair of antennas and multiple readers. For example, the readers can emit signals that are synchronized in time and phase such that the readers interrogate the RFID tag in a staggered or round-robin fashion. The processor uses information about the time and phase of the interrogation signals and the positions of each reader relative to the antenna pair to determine the angles of arrival for the LOS and NLOS paths.

For systems with multiple readers, the processor may solve for the angle of arrival of each principal component of the detected signal based on the position of the reader that triggered the signal. The processor may determine that those readers with coincident positions/intersecting angles of arrival share the same LOS path to the RFID tag. The processor may use this information to determine that other rays are the result of multipath (i.e., NLOS) instead of LOS paths.

Another method is to map the tag's trajectory to the trajectory of a human that is within view of one or more cameras. The cameras can be disposed to monitor the same volume where the antennas are used to monitor RFID tags. This method can be used in conjunction with the one above to provide a single trajectory as opposed to multiple trajectories with some vertical or horizontal shifts. More specifically, the camera(s) can be used to detect groups of moving pixels (e.g., representing a person or an object tagged with an RFID tag). A processor coupled to the camera(s) determines the groups' trajectories and assigns the RFID tag location to the group with a matching trajectory. The processor can also segment out the human body or perform pose estimation. For instance, the processor may assess the difference in trajectory of a bag swinging in a person's hand versus the trajectory of the person.

The reader(s), antennas, and processor may perform steps 302, 304, 306, 308, 310, 312, and 314 repeatedly. In one example, the steps 302 to 314 are performed at regular intervals. For example, the steps can have a repetition rate of about 0.1 Hz to about 100 Hz (e.g., about 0.1 Hz, about 0.2 Hz, about 0.5 Hz, about 1 Hz, about 2 Hz, about 5 Hz, about 10 Hz, about 20 Hz, about 50 Hz, or about 100 Hz, including any values and sub ranges in between).

In another example, steps 302 to 314 can be performed at predetermined times, in response to a command or triggering event, or both. For example, steps 302 to 314 can be performed periodically (e.g., every hour, every day, during evening inventory, etc.). They can be performed in response to the arrival of a new shipment, a stocking or re-stocking event, a user command, or detection of a possible theft. For instance, a store manager may trigger the process 300 when the store opens in the morning and closes in the evening. Or the processor may trigger the process 300 automatically, e.g., at predetermined times or in response to data from other sensors, including video cameras that monitor the same space as the RFID tag location system.

In yet another example, steps 302 to 314 can be repeated more or less frequently in response to measured changes in the number or positions of the RFID tags. For example, the processor may determine that a first RFID tag is moving if its position or corresponding LOS path angle(s) of arrival change smoothly as a function of time. The processor may correlate the first RFID tag's movement with the movement of a person from video or image data of the person or information about a second RFID tag, smartphone, or other RF transceiver carried by or affixed to the person. If the processor correlates the first RFID tag's movement with the person's movement, the processor may determine that the person is carrying the first RFID tag as well.

The processor may use this information about the first RFID tag's movement, along with knowledge of the first RFID tag's position, to trigger other actions. For example, if the first RFID tag reaches a particular area or volume or crosses a boundary surrounding an area or volume, the processor may debit the person's account for purchase of an item associated with the first RFID tag. The processor may also when update a product inventory to reflect movement or purchase of the product or sound an alarm if the first RFID tag's movement is unauthorized.

7 Virtual Reference Tags

The systems shown in FIGS. 1 and 2 and process shown in FIG. 3A can be used to identify "virtual reference RFID tags" or "virtual reference tags," which are RFID tags that can be used to generate precise location estimates for other RFID tags. Using virtual reference tags provides greater location precision for scenarios where there are multiple tags between references: the denser the environment, the more precise the location. Virtual reference tags also enable measurements of relative distances between items even if there are no non-virtual reference tags. For instance, it can be very useful to know that tag B is between tag A and tag C even if the exact locations of tags A and C are unknown.

A simple way to view reference tags is shown in FIG. 3B, which shows a system with several RFID readers 320a-320c (collectively, RFID readers 320) that interrogate RFID tags in a store or other environment. The RFID tag readers measure the RFID tags' LOS and NLOS signatures at different angles of arrival (AOAs). The plots by each reader shows the LOS signatures for subsets of the tags. A processor 328 wirelessly coupled to the RFID readers 320 compares these signatures to each other to yield information about the relative positions of the RFID tags. This processor 328 may also be coupled to a remote server or computer network, such as the internet, for sharing and using information about the tags' locations via a smartphone, tablet, or computer as described in greater detail below.

The processor 328 may determine RFID tag position by fitting the signatures to curves representing the RFID readers' receptivity patterns, determining the peak (maximum) of each curve, and interpolating between adjacent peaks to determine a Euclidean distance between peaks. This Euclidean distance represents an error or deviation in AOA for the corresponding RFID tags and RFID readers. For a pair of AOAs, if neither is known, the error represents a difference in AOA (i.e., relative AOA); if one AOA is known, the other can be estimated. Multiple relative (or absolute) AOAs for a single RFID tag can be used to estimate the RFID tag's relative (or absolute) position. Collecting more data about the RFID tags, e.g., by making more measurements with more RFID readers over more AOAs improves the location estimation precision, e.g., to better than 50 cm, 40 cm, 30 cm, 25 cm, 20 cm, 15 cm, 10 cm, or 5 cm.

FIG. 3B illustrates how this can be used to locate an RFID tag 322 at an unknown location with respect to other RFID tags and with respect to one or more known positions. It shows a 1D view with reference tags 324a and 324b (collectively, reference tags 324) at known locations on either end of a linear rack. Virtual reference tags 326a-326c and unknown RFID tag 322 are on the rack between the reference tags 324.

The plots beneath the first and second RFID tag readers 320a, 320b show the RFID tag signal amplitude versus angle of arrival for the different RFID tags. These profiles represent multipath signatures like those described above, with the highest peak representing the LOS paths 323 between the tags and the RFID tag readers 320. (The symbol above each peak matches the symbol for the corresponding tag on the rack.)

There are two plots for the first RFID tag reader 320a: the upper plot shows the multipath signatures without any obstructions between the RFID tag reader 320a and the tags, and the lower plot shows the multipath signatures with a person 321 between the RFID tag reader 320a and the left-hand tags. Note that the person 321 attenuates/changes the multipath signatures for some tags, but not for others, and does not affect the multipath signatures received by the second and third RFID tag readers 320b, 320c.

The processor 328 may determine the relative positions of tags by comparing their multipath signatures to each other. In this example, the tag signature for the RFID tag that is closest to either reference tag 324 (e.g., RFID tags 326a and 326b) has the lowest error when compared with the tag signature of the corresponding reference tag 324. The error metric used for comparing multipath signatures may be mean-squared error (MSE), dynamic time warping (DTW), or any other metric that can be used to compare the similarity of the signatures. Using the example of MSE, the lower the metric, the more similar the multipath signatures are. In a scenario where the multipath signature for RFID tag 322 is compared to the multipath signatures for reference tags 324a and 324b, if the error between the multipath signatures for RFID tag 322 and reference tag 324a is smaller than the error between the multipath signatures for RFID tag 322 and reference tag 324b, the processor 328 determines that RFID tag 322 is closer to reference tag 324a than it is to reference tag 324b. If the error between the multipath signatures for RFID tag 322 and reference tag 324b is twice the error between the multipath signatures for RFID tag 322 and reference tag 324a, then RFID tag 322 may be twice as far from reference tag 324b as it is from reference tag 324a. Other non-linear weightings may also work.

If repeated RFID signal measurements show that the RFID tags 326a and 326b aren't moving, they can be added as "virtual reference tags" even if their absolute locations are unknown (at least to the same level of precision of the locations of the reference tags 324). This process can be continued for other stationary RFID tags. For instance, RFID tag 326c is closest to RFID tag 326a, so its RFID signature should be most similar to that of RFID tag 326a. If repeated measurements show that RFID tag 326c is stationary too, then it may be designated as a virtual reference tag as well. Continuing this process along, the system can establish the order of the RFID tags (and hence the items tagged with the RFID tags). The error metrics can be used as a proxy for relative distance, and an estimate of the absolute location can be established based on relative distances and the known locations of the reference tags 324.

Because the approach described above relies on the relative errors of tag signatures, it can be further improved by using signatures at multiple readers, calculating the error by reader, and summing (or otherwise combining) the errors at the different readers. This is where virtual reference tags can be used to reduce location measurement error. Once the system has identified all of the stationary RFID tags, designated them as virtual reference tags, and located them with respect to at least their nearest neighbors, the processor 328 can locate the desired RFID tag 322 with respect to one or more nearby virtual reference tags 326 based on their multipath signatures. By measuring errors between different combinations of multipath signatures for the RFID tag 322 and the virtual reference tags 326, the processor 328 can improve the precision of its estimate for the RFID tag's actual location, e.g., to within 50 cm, 40 cm, 30 cm, 25 cm, 20 cm, 15 cm, 10 cm, or 5 cm of its actual location. The precision gets better as the number of virtual reference tags 326 goes up and the accuracy of each virtual reference tag's location improves.

The 1D example laid out above can also be extended to 2D by laying out the reference tags in a 2D space (e.g., a wall or a floor) and comparing the errors of tags, reference tags, and virtual reference tags within this space. This example can further be extended to 3D by laying the reference tags out in 3D space and comparing nearest neighbors, This approach may be further improved by anything that changes the RF communications channel between the tag and the reader. This may include moving the reader, changing the frequency the reader is operating on, or even when a person (or object) moves in the space occupied by the reader and/or tag. For instance, consider a person 321 who walks between the virtual reference tags 326 and the first and second RFID readers 320a, 320b as shown in FIG. 3B. The person attenuates or scatters the RFID signals from the virtual reference tags 326 (and the unknown RFID tag 322 and reference tags 324) propagating toward the first and second RFID readers 320a, 320b. This creates a new set of signatures at the first and second RFID readers 320a, 320b that are not perfectly correlated with the set of signatures before the change in the channel, and can thus be used to reduce the error in the estimated locations of the virtual reference tags 326 and unknown RFID tag 322.

Problems with using virtual reference tags tend to be around the large amount of processing power used to compare every tag signature to every other tag signature. The amount of processing power can be reduced by first comparing an RFID tag's signature to its last signature. If the signature hasn't changed, there's no need to run a comparison. Other ways to reduce processing power include using sources of side information (e.g., video of the region around the RFID tag and prior location information) to limit comparisons to signatures of the RFID tags that are known to be close enough to each other to matter.

To identify or designate an RFID tag as a virtual reference tag, the system measures the RFID tag's location (e.g., using methods as described above) several times over a period of time as the environment changes around the RFID tag. These location estimates may be distributed over an area or volume whose size depends on noise and the measurement uncertainty. As the number of measurements increases, the average location estimate can converge to a smaller area or volume whose size is limited by the fundamental measurement uncertainty. Once the size of the area or volume reaches a predetermined threshold, the processor sets an appropriate tag location (e.g., the centroid of the area or volume) and uses this tag location as a reference for similar tags. The system may repeat this process until a desired number or set of RFID tags have been added to the pool of virtual reference tags. Once a reference tag is set (the location is known), the method to calculate this reference tag location is proven reliable and this method can be used to estimate the locations of other tags.

The system may remove an RFID tag from the virtual reference tag pool if the RFID tag's location changes, unless similar RFID tags exhibit similar changes (e.g., due to environmental changes, such as obstruction by a person as shown in FIG. 3B). The system may identify changes in a cohort of RFID tags by looking at the signature of each RFID tag in the cohort with respect to the signatures of its cohort members. The system may also look for changes (or a lack of change) in signatures received at other AOAs from the cohort. In FIG. 3B, for instance, the person 321 may change the LOS signatures received by the first and second RFID readers 320a, 320b in a correlated fashion, but shouldn't affect the LOS signatures received by the third RFID reader 320c. The combination of correlated changes from certain AOAs and no change in other AOAs among a cohort of RFID tags may indicate that the cohort isn't moving.

The change of the RFID location may be discounted in one or more of the following situations. For instance, if there aren't any relative changes among different RFID tags, it may be likely that all of the tags are obstructed or moving together. In another example, the relative change is below a predetermined threshold (e.g., the measurement uncertainty). In yet another example, the relative change is brief enough (e.g., within one, two, or three measurement cycles).

Information about virtual reference tags can be combined with other information to increase RFID tag location precision. For instance, an RFID tag location system may use the (estimated) locations of virtual reference tags, product count data, and visual data from one or more cameras to determine the average density of products between virtual and/or real reference tags. Additionally, visual data can be used to determine if a person is or was close enough to pick up or put down a product or RFID tag (pose/reach estimation can be done as well). If the visual data shows that a virtual reference tag or product with the virtual reference moves or has moved, the system may remove that virtual reference tag from the pool of virtual reference tags. Conversely, if the visual data shows that a particular RFID tag doesn't move for a long period (e.g., hours or days), then the system may designate that RFID tag as a virtual reference tag.

8 Computer Vision System and Computer Vision System Training

The RFID techniques described above can be used to train a computer vision system to locate and/or identify different objects captured by cameras in or coupled to the computer vision system. For instance, the computer vision system may include or be coupled to multiple cameras, which can be disposed to monitor a wide-angle area. In addition, light sources emitting light at different wavelengths and/or intensities can also be used to generate different environments so as to enhance the training of the computer vision system. Training images are acquired by the cameras under different environments.

A combination computer vision/RFID tag location system can cross-reference timestamp data of scanned barcodes/transactions, the items in the barcode/transaction, and camera data corresponding to the location of said register or checkout kiosk in order to pull frames that contain those items. A processor running object detection on those frames can draw bounding boxes around the imagery to produce additional tagged imagery.

During the training of the computer vision system, such as a processor executing an artificial neural network, the RFID techniques described above are employed to locate and identify objects in the training images. These objects are separated into discrete images, which are fed into training sets for the computer vision system (e.g., an artificial neural network). If the computer vision system does not distinguish objects that are too close together, reinforced learning can be used to filter multiple objects. Additionally, the training can train the computer vision system to recognize objects, such as light fixtures, doors, and shopping carts, which may be irrelevant during the use of the computer vision system in, for example, a retail store. These objects can be then removed from the training data set and frames containing images of these objects may be marked as occluded frames. Since the RFID techniques described above can automatically identify objects with RFID tags in an efficient manner, a massive database of product images can be constructed without the need of humans to validate or verify the contents of the database.

In certain cases, there may be error in the location of the tag relative to the actual object. In these situations, one could plot the location of tag from frame to frame relative to the locations of humans or objects from frame to frame (e.g., attaining groups of moving contiguous pixels via optical flow or re-identification) and average the distance from each set of contiguous pixel groups to each RFID tag across n frames and group them based on which pairings resulted in the lowest error/average distance. A Kalman filter would work well to filter/group the objects and/or objects. One could also incorporate the first and second derivatives of the RFID tag and pixel blob motion functions for weighting a match. If the goal is to attribute a product to a person, one can run human detection in each frame to only select pixels that correspond to the human figure. If the goal is to gather annotated images, then one could use human detection to simply ignore the pixels that correspond to the human figure in the bounding box generation/pixel segmentation.

FIGS. 3C-3F show a sequence of video frames showing movement of a shirt tagged with an RFID tag. The small circle represents the estimated location of the RFID tag which is attached to the shirt. The box is around a pixel blob with which the system has correlated the RFID tag motion derived from the RFID signals received by the RFID tag readers. As shown in FIGS. 3C-3F, there is significant error in where the system estimates the RFID tag to be versus where the object actually is from frame to frame, but the system is still able to attach the RFID location estimate to a pixel blob.

Figure 3G:
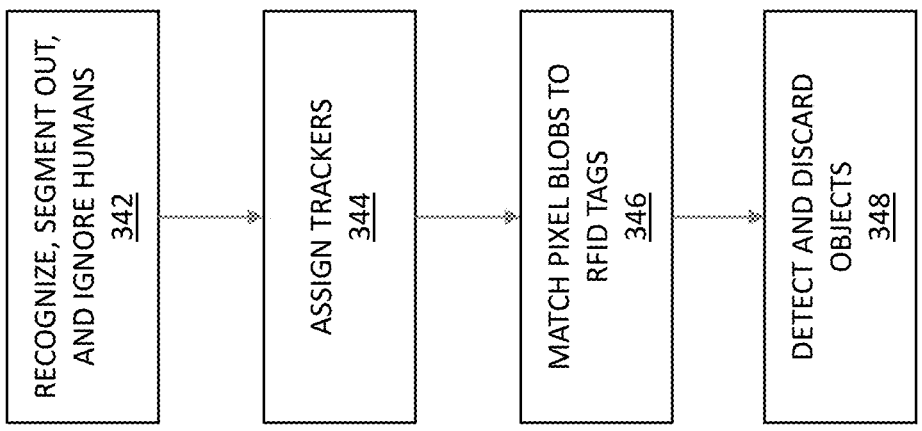
FIG. 3G is a flowchart illustrate a method for correlating RFID tag measurements with image data.

FIG. 3G illustrates a process 340 for correlating RFID tag location estimates with video data. This process 340 can be used to train neural networks to recognize items tagged with RFID tags or to correlate motion of tagged and untagged objects (e.g., a garment with an RFID tag and a person). The process 340 starts with recognizing, segmenting out, and ignoring pixel blobs representing humans in the images with a trained neural network (342). Then the remaining pixel blobs in the images are assigned a tracker which looks at their motion from frame to frame (344). Each pixel blob is then matched with the RFID tag that most closely follows its trajectory given a certain threshold (346). Once pixel groups have been paired to respective RFID tags, one can run object detection on each pixel group in each frame to throw out images that clearly do not match the RFID tag description due to environmental occlusions, such as bags, carts, jackets, humans, and other such occlusion sources (348). Attributing tag data to a pixel blob also serves to reduce or eliminate the error between tag location and item location.

On another note, the RFID location provides constant feedback to the artificial neural network such that it is always learning what it got correct in each frame and what it got wrong. This extends to autonomous checkout and human/product interactions where the process 340 can be used to teach the vision system on a frame by frame basis what was right and what was wrong.

9 Tracking Moving RFID Tags

Figure 4:
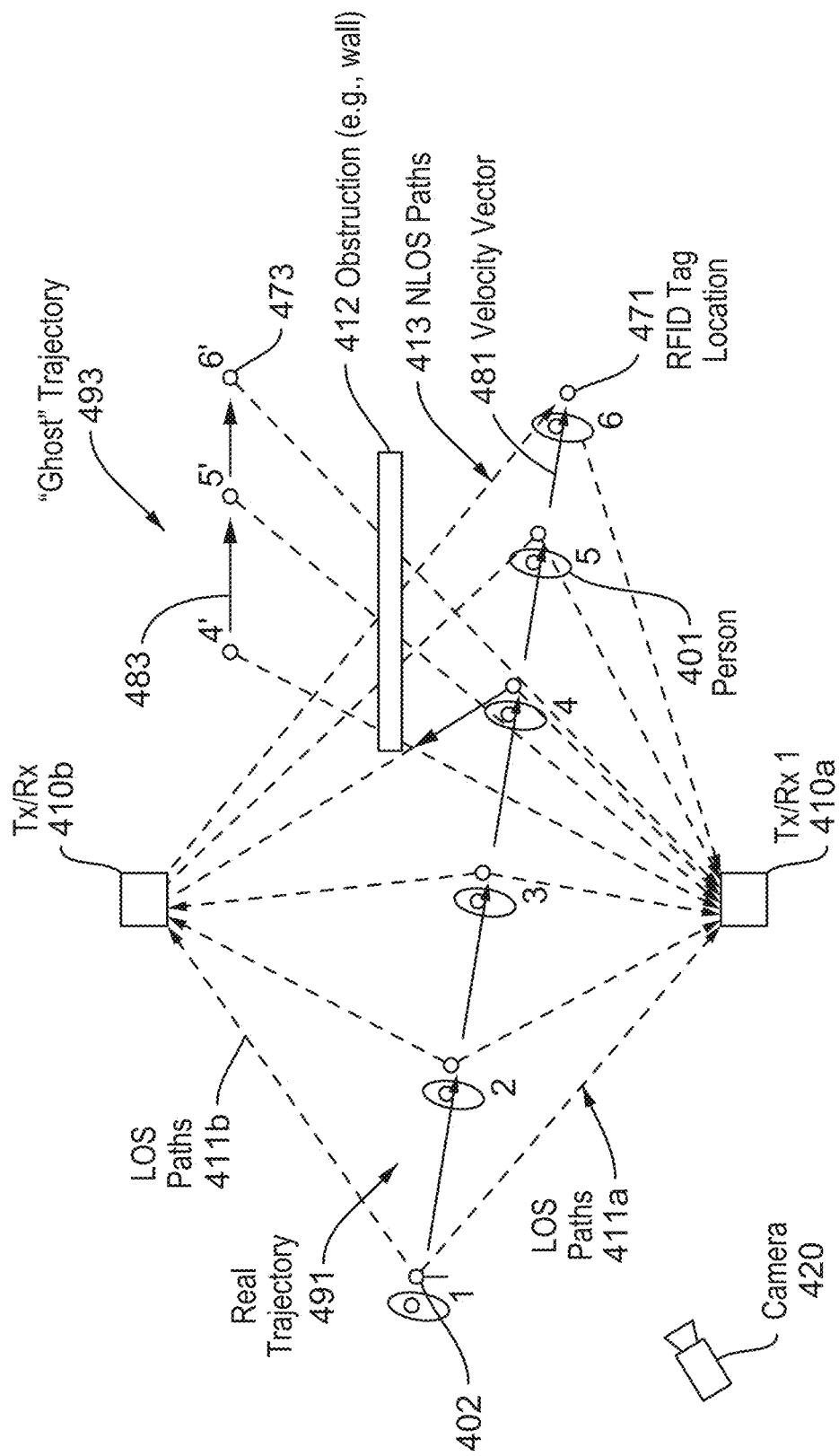
FIG. 4 illustrates LOS and NLOS signal paths from a moving RFID tag to a pair of antennas and the corresponding real and "ghost" velocity vectors and trajectories derived by the LOS and NLOS signals.

FIG. 4 illustrates how the RFID systems and processes described above can be used to track an RFID tag 402 moving in an environment filled with obstructions, such as a store, stockroom, or warehouse. In this example, a pair of RFID tag readers 410a and 410b (collectively, RFID tag readers 410) interrogate the RFID tag 402 by transmitting RFID interrogation signals at regular intervals, e.g., at a rate of about 0.01 Hz to about 1.0 Hz. The RFID tag readers 410 may vary the interrogation rate based on signals received from the RFID tag 410. If the RFID tag's response signals indicate that the RFID tag is moving at high speed, changing speed, or changing direction, the RFID tag readers 410 may increase their interrogation rates to provide finer spatiotemporal resolution of the RFID tag's motion. Conversely, if the RFID tag's response signals indicate that the RFID tag is stationary or moving slowly, then the RFID tag readers 410 may decrease their interrogation rates to conserve energy. The RFID tag readers 410 may increase or decrease their interrogation rates together or independently depending on the relative motion of the RFID tag 402.

The RFID tag readers 410 may broadcast the interrogation signals over a wide range of angles, e.g., via isotropically emitting antennas, or scan them over different angles with an antenna array as described above. A processor (not shown) wirelessly coupled to the RFID tag readers 410 uses the RFID signals from the RFID tag 402 to compute velocity vectors 481 and a trajectory 491 for the RFID tag 402. To compute a given velocity vector 481, the processor may determine the RFID tag's locations 471 at different moments in time, then determine a vector connecting those locations in 2D or 3D space. Scaling that vector by the time difference yields the velocity vector.

The processor can use the location measurements and/or the velocity vectors 481 to determine the RFID tag's trajectory 491. This can be a historical trajectory (i.e., where the RFID tag 402 has been) or a predicted trajectory (i.e., where the RFID tag 402 is going based on its estimated velocity). If desired, the RFID tag's current velocity, recent trajectory, and/or predicted trajectory can be displayed on a smartphone, tablet, or other electronic device and used to trigger a transaction (e.g., a sale of an item associated with the RFID tag 402), prevent misplacement or theft, or track an item as it transits a warehouse as described in greater detail below. If the velocity vectors 481 and trajectory 491 indicate that the RFID tag 402 isn't moving, then the processor may select the RFID tag 402 as a virtual reference RFID tag as described above.

The processor can also use the location measurements, velocity vectors 481, and trajectory 491 to distinguish a "real" RFID tag, such as RFID tag 410 in FIG. 4, from an aliased or "ghost" RFID tag 482. In this case, the ghost RFID tag 482 is caused by multipath effects. More specifically, FIG. 4 shows that RFID signals propagating between the real RFID tag 402 and the RFID tag readers 410a, 410b can take LOS paths 411a, 411b, resulting in accurate measurements of the RFID tag's location, velocity, and trajectory. These RFID signals can also take NLOS paths 413 between the real RFID tag 402 and the RFID tag readers 410. In this example, some fraction of the RFID energy radiated by the RFID tag 402 reflects or scatters off a wall 412 to the first receiver 410a. And when the RFID tag 402 is in certain positions, this wall 412 prevents it from sending RFID signals to the second receiver 410b. In short, the wall 412 causes the first RFID tag reader 410a to receive spurious RFID signals and stops the second RFID tag reader 410b from receiving any RFID signals when the RFID tag 402 is between the wall 412 and the first RFID tag reader 412a.

In this case, processing the spurious RFID signals naively results in the appearance of the ghost RFID tag 482 shown in FIG. 4, complete with ghost locations 473, ghost velocity vectors 483, and a ghost trajectory 493. The processor may distinguish the ghost tag 482 from a corresponding real tag 402 based on discontinuities in the ghost velocity vectors 483 and ghost trajectory 493 and/or on similarities between the ghost velocity vectors 483 and real velocity vectors 481 and between the ghost trajectory 493 and the real trajectory 491. In particular, the real and ghost velocities and trajectories appear with mirror symmetry about a line or plane defined by the wall 412. The processor can use this mirror symmetry and the abrupt discontinuities at the beginning and end of the ghost trajectory 493 (where the wall 412 begins and ends) to distinguish between the real RFID tag 402 and ghost RFID tag 482.

A camera 420 can be used to track the RFID tag 402 as well. In FIG. 4, the camera 420 takes pictures (e.g., at or around video rates) of a person 401 carrying the RFID tag 402. The processor may use an artificial neural network to recognize the person 401 (e.g., as a generic person, as an employee, or as a specific person) appearing in the image and correlate that person's motion with the motion of the RFID tag 402. If the RFID tag 402 is on a nametag, wristband, or ID card, this can be done as part of a process of training the neural network to recognize the person associated with the RFID tag 402. If the neural network has already been trained, then the processor may use the overlapping or coincident motion of the person and the RFID tag 402 for tracking or to trigger another action, such as a sale of an item carried by the person or to which the RFID tag 402 is affixed.

10 an RFID Tag Location System in Store with Retail Space and a Stockroom

Figure 5A:
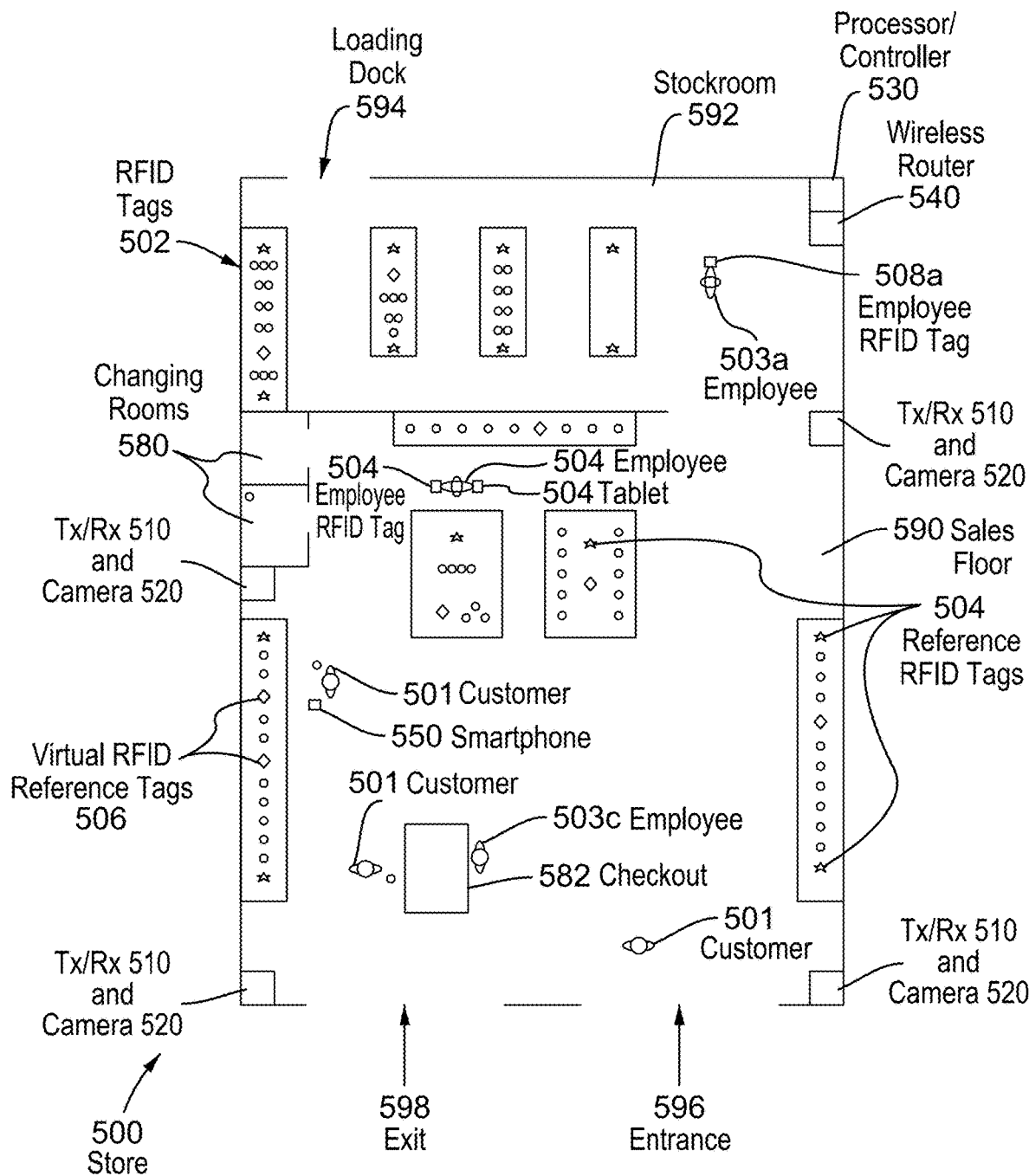
FIG. 5A shows an RFID tag location system in a retail store and a stockroom.
Figure 5B:
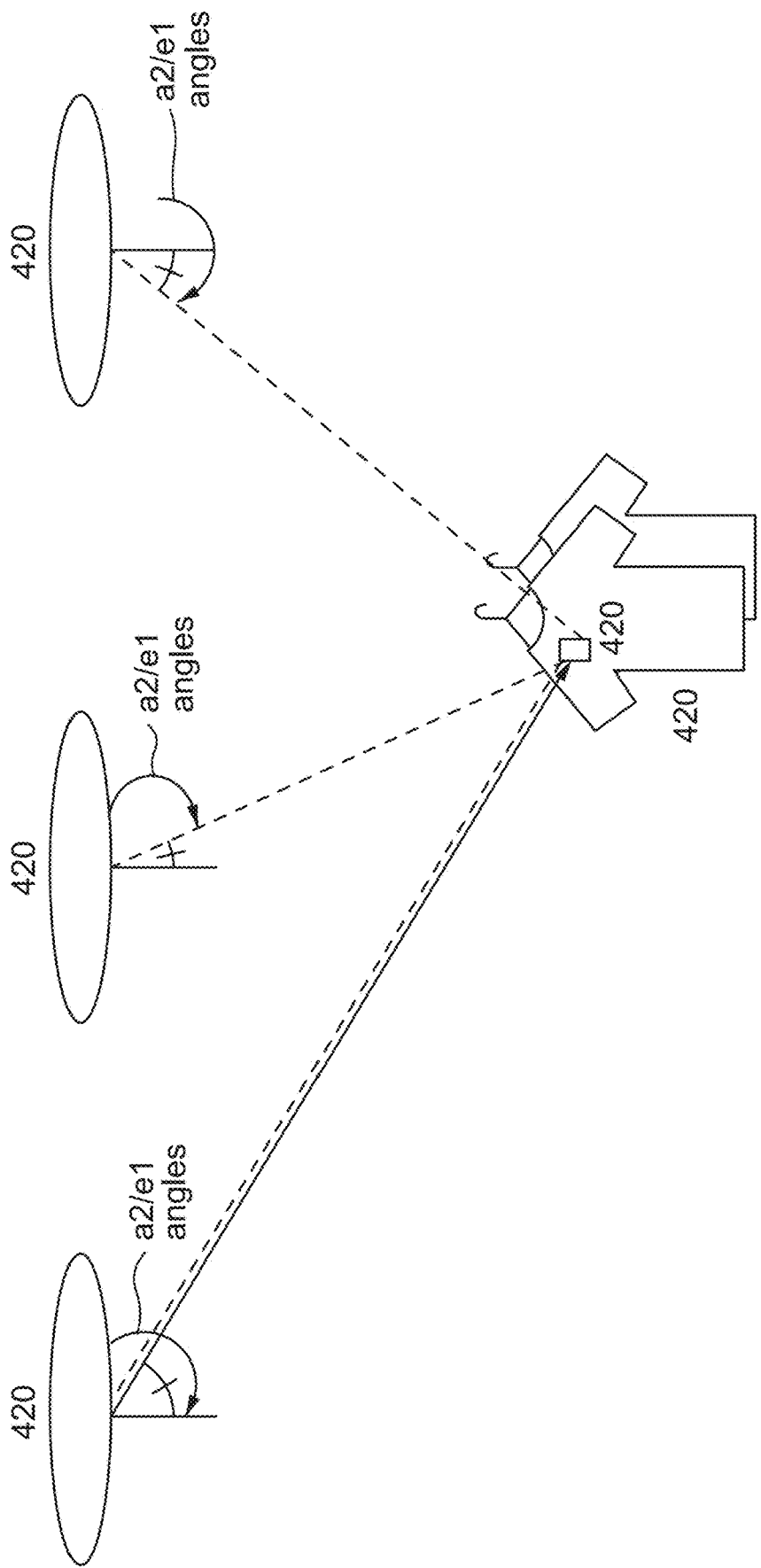
FIG. 5B shows RFID tag transmitters and receivers above items for sale in the retail store of FIG. 5A.

FIGS. 5A and 5B show different views of an RFID tag location system in a store 500. The RFID tag location system includes several RFID tag readers 510 distributed throughout the store's sales floor 590, stockroom 592, and changing rooms 580. The RFID tag readers 510 can be placed at or near the ceiling, e.g., as shown in FIG. 5B, to provide clearer lines of sight to RFID tags 502 on merchandise on the sales floor 590 and in the stockroom 592. Placing the RFID tag readers 510 above the RFID tags 502 also makes it possible measure each tag's 3D location using azimuth and elevation information derived from the RFID signals received by the RFID tag readers.

The RFID tags 502 may be distributed throughout the store 500, including on items for sale, such as clothing and other merchandise. The RFID tags 502 may be embedded in the items or attached to the items with tags, clips, or stickers. There may be other types of RFID tags in the store 500, including reference RFID tags 504 in known locations, such as fixed or movable clothing racks, walls, or tables. In addition, some of the moveable RFID tags 502 may be designated as virtual reference RFID tags 506 if they remain motionless over a long enough period of time. And some RFID tags may be attached to ID cards 508a and 508b (collectively, ID cards 508), key fobs, bracelets, or other items worn or carried by employees 503a-503c (collectively, employees 503) or customers 501. These ID cards 508 may identify specific employees and their locations. Likewise, there may be RFID tags 502 embedded in or attached to shopping bags, baskets, or carts at an entrance 596 to the store.

The RFID tag readers 510 communicate wirelessly with a processor/controller 530 via a wireless router 540 or another suitable device. Cameras, which are shown collocated with the RFID tag readers 510, communicate with the processor 530 as well. The processor 530, in turn, can communicate with tablets 530 and smartphones 540 carried by the customers 501 and employees 503. It may also communicate via a suitable communications network, such as the internet, with one or more servers, databases, or other remote devices that track the store's inventory and operations.

In operation, the RFID tag readers 510 measure the RFID tags' locations, velocities, and trajectories as described above. It uses this information to monitor inventory and trigger actions associated with the items tagged with the RFID tags 502. For instance, if the RFID tag readers 510 detect an RFID tag 502 moving toward the store's exit 598 and the cameras 520 detect a customer 501 moving along the same trajectory, the processor 530 may trigger an automatic purchase of the associated item by the customer 501. This enables the customer 501 to skip the checkout 582, saving time. The processor 530 may also direct customers 501 and employees 503 to particular items based on precise RFID location estimates by the RFID tag readers 520. This feature can be used to direct a customer 501 to a desired item, such as a shirt in a specific size or color; to control and re-shelve inventory, such as items left in the changing rooms; or to determine how inventory placement affects sales. These and other applications are described in greater detail below.

11 Applications of High-Precision Object Location with RFID Technology

The RFID tag location techniques described above provide fine spatial resolution and high precision, making them suitable for a wide number of applications, many of which are not possible with other RFID tag location techniques. Some of these applications are described below and can be used with systems and in environments like those shown in FIGS. 5A and 5B.

11.1 Tracking RFID Tag Movement

In one example, the RFID techniques can be used in retail stores, in particular in omnichannel (also spelled omni-channel) stores. "Omnichannel" refers to a multichannel approach to sales that seeks to provide customers with a seamless shopping experience, regardless of whether the customer is shopping online from a desktop or mobile device, by telephone, or in a brick-and-mortar store. What distinguishes the omnichannel customer experience from the multichannel customer experience is that there is true integration between channels on the back end. For example, when a store has implemented an omnichannel approach, the customer service representative in the store can immediately reference the customer's previous purchases and preferences just as easily as a customer service representative on the phone or a customer service webchat representative. Or the customer can use a computer, tablet, or smartphone to check inventory by store on the company's website or app, purchase the item later via the website or app, and pick up the product at the customer's chosen location.

One issue that retailers have with omnichannel orders is detecting that an item has been picked by an omnichannel order. To address this issue, an RFID tag (referred to as a tote tag) can be placed on a tote, a shopping bag, a shopping cart, or any other suitable container. Each item for sale also includes or is affixed to a separate RFID tag (referred to as an item tag). Antennas arrays monitor the location of each tote tag and each item tag. If the distance between one item tag and one tote tag is below a threshold value (e.g., less than the size of the tote), the system determines that the item corresponding to the item tag is in the tote. To improve the reliability of the detection, the system can further monitor the movement of the tote tag and the item tag. If they move together for a distance above a threshold value (e.g., more than 1 meter), the system can determine that the item and the tote are being carried by a customer.

The system can also monitor the movement customers to determine whether an item is picked by the customer. For example, if an item moves together with a customer for a distance above a threshold value (e.g., more than 1 meter), the system can determine that the item is being carried by the customer. For example, a customer can install a User App on his/her smartphone, and the system can detect the presence of the customer's smartphone via communication with the User App. The system can then track the movement of the smartphone (and accordingly the customer) using Bluetooth, WiFi, LTE, 3G, 4G, or any other wireless technique.

In some cases, the system can maintain a record of all smartphones that do not belong to customers (e.g., store's own devices or employees' personal devices). Once the system detects a smartphone not in the record, the system can determine that a customer enters the store and can track the movement of the customer by tracking the smartphone.

The system may also track the movement of a customer using facial recognition, gaiter recognition, or other recognition techniques. For example, a camera can be placed at the entrance of the store to recognize a customer, and one or more cameras can be distributed within the store to monitor the entire store space. Every time the customer is captured by a camera and recognized, the location of recognition can be recorded and compiled with previous locations to map out the movement of the customer. The resolution of this monitoring (e.g., distance between two recognitions of the same customer) may depend on the number of cameras in the store (e.g., a larger number of cameras can increase the resolution). The system can then determine that an item is picked by the customer if they move together for a distance greater than a threshold value. Alternatively, or additionally, the system may determine that an item is picked by the customer if they appear together at more than 3 locations. The system may also determine that an item is picked by the customer if two locations where they appear together are more than 1 meter apart.

The system can further update the inventory when it determines that an item that was previously determined to be picked up by a customer is placed back and available for sale. The system may determine that an item is placed back if the item does not move for an extended period of time (e.g., longer than 5 minutes). To improve the reliability, the system may also check whether there is any customer near the item while the item is not moving. In the absence of any customer staying near the item, the system may determine that the item is placed back (e.g., because the customer who previously picked the item changed his mind and abandoned the item).

In another example, the RFID techniques can be used to determine whether an item is in the right place in the store. In this case, one or more tags (referred to as shelf tags) can be placed on each shelf that holds the items for sale. Each shelf tag identifies a particular location on the shelf for a corresponding item. Each item also has an item tag. For instance, the shelf tag may indicate a location for men's pants, and the item tag may be affixed to a pair of men's pants. The system interrogates the locations of the shelf tag and the item tag to estimate the distance between them. If the distance is below a threshold value, the system can determine that the item is in the right place. If, on the other hand, the distance is greater than the threshold value, the system can alert one or more store employees that the item is in wrong place and should be moved to the right place. The system may also provide instructions to the employee(s) about the item's actual location and its proper location.

The system can also determine whether an item is in the right place using tags attached to any other retail fixtures (these tags are referred to as fixture tags). In general, each fixture tag can provide information about the identification of the fixture (e.g., shelf, table, counter, display case, basket, grid, etc.), the location of the fixture, and the type and quantity of items in the fixture. In some cases, the type and quantity of items in a fixture can be determined based on industry standards. Alternatively, the type and quantity of items in a fixture can be customized for each store.

In addition, each employee can wear a tag (referred to as an employee tag). In one example, the employees can wear a bracelet including an RFID tag. In another example, the RFID tags can be sewn into the employees' uniforms. In yet another example, the RFID tag can be included in badges worn by the employees. The system may use these tags to estimate and track the employees' locations, e.g., for use in managing inventory as described below.

In some cases, the movement of employees can be monitored by software without using RFID tags attached to employees. For example, the system can monitor the movement of an employee by tracking the employee's smartphone. In these cases, the employee can install a User App to facilitate communication between the smartphone and the system. The system can recognize the employee from, for example, his or her user account on the User App.

In another example, the system can track the employee's wearable device, such as a smart watch, an activity tracker (e.g., Fitbit), or smart glasses (e.g., glasses with embedded electronics), among other devices. In this example, the system can maintain a record of wearable devices that belong to each employee so as to recognize the employee whenever the wearable device is detected. A system with a camera can also track an employee via an RFID tag on an item that camera recognizes as being held or carried by the employee.

For instance, if the system determines that an item is misplaced or should be brought from back stock to the right shelf, the system can estimate the locations of all employees using the employee tags. It may then identify the employee who is closest to or moving towards the misplaced item. The system can alert that employee to place the item into the right place. The system can also estimate and/or measure the time it takes the employee to complete the task (e.g., time duration from the alert to the completion). This information can be used to review employee performance and identify changes to the store layout that could improve efficiency.

Several criteria can be used by the system to determine the appropriate employee(s) to receive the alert. For example, the system can deliver the alert to employees based on the employees' availability to receive and respond to the alert. In this example, an employee can communicate his availability (or unavailability) to the system via his employee device, such as a smartphone installed with a User App. The employee may indicate that he is in the middle of other tasks that may not be interrupted.

In another example, the system can send the alert to employees based on their proximity to item(s) at issue. For a misplaced item, the proximity can be quantified by the distance between the employee and the misplaced item. For an item to be placed, the proximity can be quantified by the distance between the employee and the stockroom. In some cases, the proximity estimation takes into account the building or structure of the store. For example, the system may preferably send the alert to employees on the same floor as the item at issue, instead of sending the alert to employees on different floors.

In yet another example, the system can send the alert to employees based on their ability to complete the task. For example, if an item in the women's clothing department is misplaced or an item is found abandoned in the women's fitting room, the system may preferably send the alert to an employee in the women's clothing department, instead of employees in the grocery department.

The ability to complete the task may also be determined based on the current tasks an employee is handling. For example, if an employee is already handling some misplaced items, it may be more efficient for him to handle similar tasks. The system may also consult with the quality assurance system to determine an employee's ability. For example, the system may include a database of employees' performance review of each task they handled before. If the system determines that an employee restocks misplaced items with good efficiency, the system may preferably send the alert to that employee.

In yet another example, the system may use a combination or weighted combination of the above criteria to determine the most appropriate employee to handle the issue. For example, the system may first find out employees who are available. Then among these available employees, the system finds those who are within a certain distance to the item at issue. Out of these employees, the system can then determine the most appropriate employee(s) based on the employee's ability to complete the tasks.

In some cases, the system may send the alert only to the most appropriate employee (determined by any suitable method). Alternatively, the system may send the alert to a group of appropriate employees, and each recipient can respond using his or her device (e.g., smartphone). Once a recipient responds by indicating that he or she is going to handle the task, the system may update the status of the issue to, for example, "in progress."

The system may also send the alert to the supervisor(s) of appropriate employees determined by the system. Alternatively, or additionally, the system may also copy the alert to personnel in quality assurance department so as to alert them to monitor the progress of the issue.

RFID techniques can also be used to monitor the inventory availability of a store in a real-time manner. In this case, the system can track the movement of items that are picked up by customers. As described above, the system can determine that an item has been picked up by a customer if it is moving together with a tote. More specifically, the system may use the motion/trajectory of the item's RFID tag and the motion/trajectory of the tote as determined from video data and/or data about an RFID tag on or in the tote to determine that the item is in the tote. Once the system determines that an item is picked up, the system deducts that item from the available inventory. Alternatively, the system can deduct the item from the inventory until the item passes through the register where the item is checked out. In some cases, the system can also deduct an item, such as apparel or a pair of shoes, if the customer is wearing the item.

The RFID techniques can also facilitate validation of e-commerce orders, especially after the shipping box is sealed. RF signals can usually penetrate through shipping boxes so the RFID techniques described above can be used to identify items with RFID tags in the shipping box. The identified items are then compared with the order corresponding to this shipment so as to determine whether any item is missing, or any item should not be in the shipping box. If a missing item is confirmed, the system can check the inventory or other database to find out whether a replacement item is in the distribution center (DC) or a nearby store. The system can also prevent the shipping box from leaving the store and/or DC until the item is placed in the shipping box or located for separate shipment.

In some cases, the RFID techniques can be used in dressing rooms to track items that are tried on by customers. The system can determine whether an item left in the dressing room has been in the dressing room for a longer than a threshold time (e.g., longer than 15 minutes). Alternatively, the system can track the location of the item as well as the status of the dressing room. For example, in the case when the system determines that an item is in the dressing room and the dressing room is unused, the system can determine that the item is left in the dressing room. In these cases, the system can alert an employee to pick up the item and place it back on a shelf for sale.

The system may determine the status of the fitting room by tracking the presence of a customer's mobile or wearable device in the fitting room. For example, the system can generate a map of the fitting rooms and display mobile and wearable devices detected in each fitting room. If no device is found in a fitting room, the system can indicate that the fitting room is probably unused. In this case, an employee can go to the fitting room to pick up abandoned items.

The system may also determine the status of the fitting room using an RFID tag attached to the door of a fitting room (e.g., on the moving edge of the door). In this case, the door of the fitting room can be designed to move away from the frame if it is unlocked. Therefore, the RFID tag is at a first location when the door is closed or locked (i.e., when the fitting room is occupied) and at a second location when the door is open or unlocked (i.e., when the fitting room is unoccupied). The system can then determine the status of the fitting room based on the location of the RFID tag on the door. Similarly, another option is to install several reference tags in or on the fitting room curtain and detect them shifting closer together or farther apart as a result of someone opening and closing curtain.

Alternatively, each fitting room can use two RFID tags: one is placed on the moving edge of the door and the other is placed on the frame of the door. Alternatively, the RFID tags can be placed on or integrated into different parts of a lock on the fitting room door. The system can then determine the distance between these two tags. If they are within a threshold value (e.g., about 10 cm), the system can determine that the door is closed or locked; otherwise, the system can determine the door is open or unlocked and the fitting room is unoccupied.

Additionally, the system may use a combination of location and amplitude shift in the RFID signal to determine if a garment with an RFID tag is on a person. For example, if the garment is suspended in mid-air in the middle of the fitting room, it is likely on the body. If the RFID tag location system detects a noticeable dip in RSSI accompanied by an indication (e.g., from camera data) that the RFID tag is close to the person's body, it may determine that the object/garment tagged with the RFID tag is likely on the person's body.

11.2 Shelving Items with RFID Tags

Precise tracking of items also allows the system to place items on shelves using autonomous vehicles (e.g., robotic devices, drones, etc.) without human intervention. For example, an RFID tag can be attached to each item providing information about the desired location of the item in the store. The autonomous vehicle can include a tag reader to read the RFID tag and deliver the item to the desired location. The desired location (e.g., a designated shelf) can also be marked by an RFID tag (referred to as a fixture tag). In some cases, the autonomous vehicle uses its internal tag reader to locate the fixture tag and estimate the distance and direction from its current location to the fixture tag and use the estimate to navigate toward the fixture.

In some cases, the system can monitor the location of a remotely controlled vehicle using an RFID tag on or embedded in the vehicle. If desired, the system or a user may direct the vehicle to move toward the fixture. In these cases, the vehicle may not include any tag reader.

Alternatively, the RFID tag can include the item's identification information (e.g., a serial number), but not the item's desired or intended location. Instead, the identification information is associated with the desired location information in a database. An RFID tag reader (e.g., on an autonomous vehicle) can read the identification information and communicate with the database to retrieve the location information.

Automatic shelving with autonomous vehicles can be performed every night after closing of the store and/or every morning before the opening of the store. In some cases, the shelving procedure is automatic such that it can be performed without human monitoring. Accordingly, the shelving can be performed after hours so as to save overtime cost.

In some cases, the shelving can be performed on demand. For example, when the system determines that an item is on demand, the system can send a person or robot to the stockroom to pick one item and deliver the item to the desired location. In some cases, the person or robot may also be directed to pick a misplaced item and place it in the correct location. The system can direct the robot to the location of the misplaced item and to the item's desired location. In some cases the RFID tag data and/or camera data may also reveal orientation of the object and other information, such as weight, geometry, and weight distribution, to aid in complex problems such as grasping.

11.3 Monitoring Inventory of Items with RFID Tags

The system can monitor the inventory of items based on the precise tracking of the items' locations with RFID tags. As described above, the system can determine that an item has been picked or is being carried by a customer, in which case the system can remove this item from the list of available items. The system can further place this item to a temporary list of items under consideration for purchase by the customer. Once the item is checked out by the customer (e.g., in the event that the customer leaves the store with the item), the system can remove this item from the temporary list. If, however, the customer changes his mind and places the item back (or simply abandons the item) before checking out, the system can put this item back to the available list.

In some cases, once the system determines that an item is under consideration by a customer, the system can interrogate the RFID tag attached to the item at a frequency greater than 1 Hz to track the movement of the item. Once the item is placed back to the shelf, the interrogation frequency may be reduced to reduce computing burden of the system.

Employees may participate in the inventory monitoring by handling defective items. A defective item may be identified by an employee or a customer. In either case, the employee may use an employee device to scan the RFID tag on the item and enter the status (e.g., "defective" or "damaged") of the item to the system. The employee device can include a tag reader and an interactive interface (e.g., a touch screen) for the employee to update the inventory. In response to receiving the status, the system can remove the item from the available list and put the item into another list (e.g., repair list or return list). The system can also send one or more alerts to relevant personnel to handle the defective item.

11.4 Employee and Product Location Using RFID Tag Location System

Figure 6:
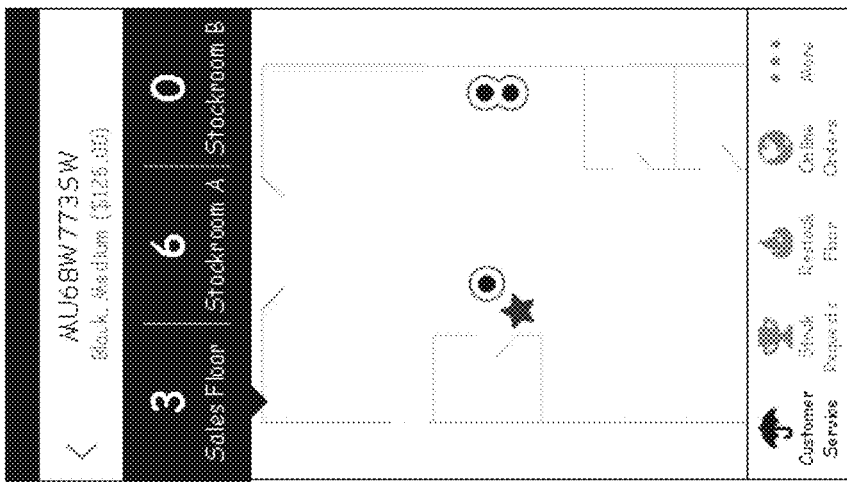
FIG. 6 shows a graphical user interface (GUI) of a smartphone or tablet displaying employee and product locations derived from RFID tag location data.

The RFID tag location system may include a plurality of cameras, RFID tags, and wireless communication systems such as Bluetooth or Wi-Fi to track the precise locations of employees and products within a store. The location of employees and products may be derived from RFID tag location data collected by the RFID tag location system and then displayed using a GUI on a smartphone or tablet. FIG. 6 shows an example GUI that displays the location of an employee and several products on a floor plan of the store. Since the RFID tag location system can identify the exact locations of both employees and products, the relative locations between the employees and products can also be displayed, as shown in FIG. 6. In addition to displaying the location of products on a floor plan, as shown in FIG. 6, the location of products may also be displayed in a virtual tour of the store, in a 3D view of the store, or in an online shopping feature.

11.5 Product Selection Using the GUI

Figure 7A:
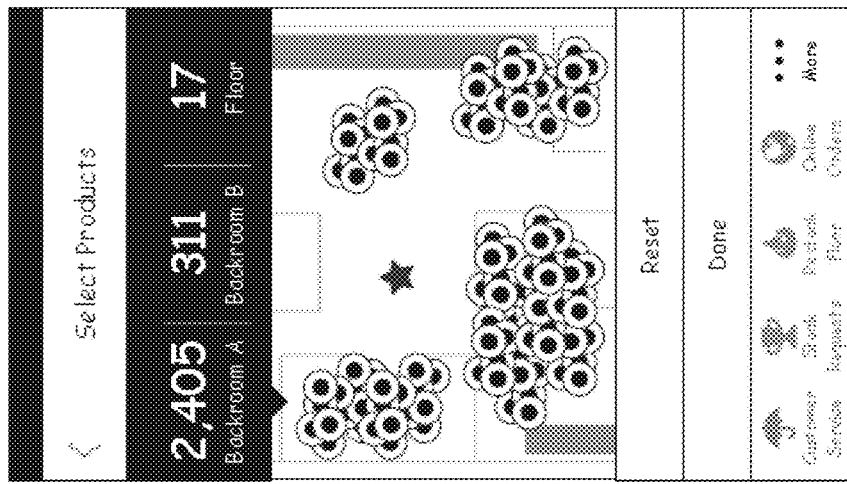
FIGS. 7A-7D show how the GUI can be used to select products or other items with RFID tags for specific actions.
Figure 7D:
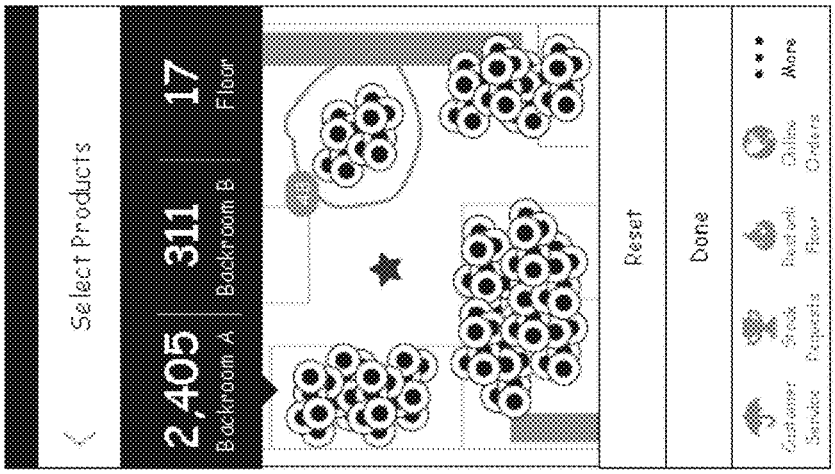
Figure 7C:
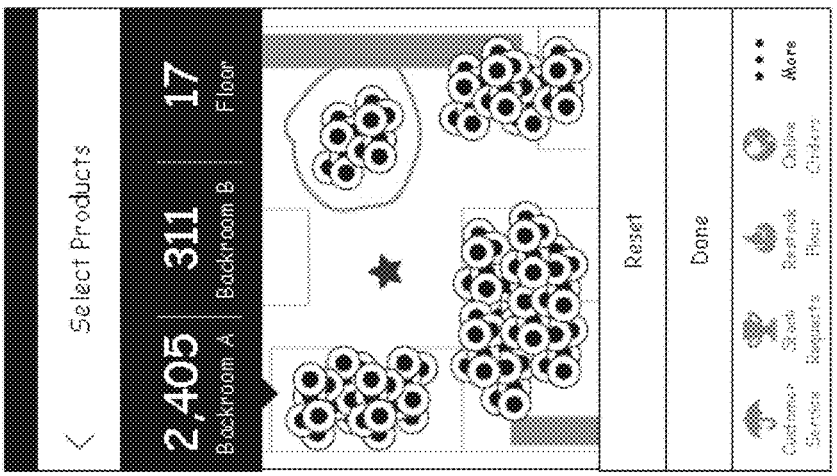
Figure 7B:
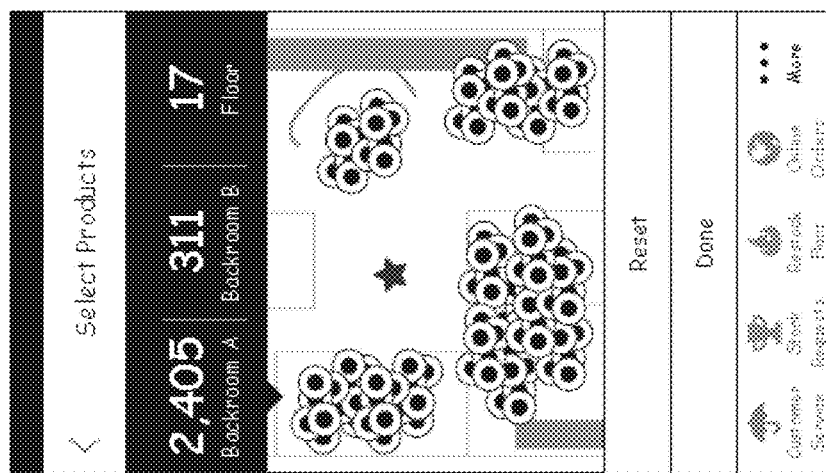

The GUI, as described, can display one or multiple products on a floor plan of the store. The GUI may also allow a user, an employee or a customer, to interact with the displayed products in order to perform specific actions. User interaction with the GUI may be accomplished by several methods including a pointing device, such as a mouse, a touch-based system, such as a user's fingers or a stylus, and so on. For example, in a touch-based system, the user may select one or more products by drawing a shape around the products displayed in the GUI with their finger. This process is illustrated in FIG. 7A through FIG. 7D. FIG. 7A shows numerous products displayed in the GUI. The user may use their finger to begin drawing a circular shape around multiple products, as shown in FIG. 7B, until completing the circular shape as shown in FIG. 7C. The products contained within the circular shape are thus selected. Prior to a user specified action, information on the selected products may be displayed such as the number of products selected, as shown in FIG. 7D.

Once products are selected by the user, the user may then specify numerous actions to be performed on the selected products. These actions may include the following: (1) listing product details, e.g., style number, color, price, size, etc., (2) listing quantity or value sold, (3) instructing the RFID Reader to only read the selected products, e.g., during receipt of a new shipment, conducting an inventory count, etc. (4) changing the floor display of specific products, (5) choosing to receive a price alert on selected products, (6) displaying information on similar products, (7) receiving recommendations on similar products or newer models of selected products, or (8) having selected products delivered or picked for purchase. Some actions may only be available to either employees or customers depending on their function.

11.6 Updating Inventory and Automatic Notifications of New Shipments of Product The RFID tag location system may also be used to facilitate updates to inventory when new shipments of product arrive at store. For example, a shipment may be delivered to a store from a manufacturer, warehouse, distribution center, or another store. To verify the quantity of product in the shipment, an RFID reader and a User App can be used. The RFID reader can be optimally located in a stores shipment process area such as the stockroom, the sales floor, or other locations a retailer may use to process inbound shipments.

Products contained in the shipment may or may not include RFID tags. For products that do have RFID tags, employees can use the RFID reader and a User App to verify the quantity of products received matches a corresponding invoice for the product order. For products that do not have RFID tags, employees can add RFID tags to the product and encode the tag with appropriate product information using the RFID reader and User App. These products can then be added prior to confirming the quantity of product received in the shipment.

Once the quantity of product received is verified, the RFID stock of the product and a master corporate stock of the product, which may include products with and without RFID tags across multiple stores, will be updated to show accurate stock levels of the product at the store where the shipment was received and at a corporate level across multiple stores. If a discrepancy were to exist between the quantity of product received and in the invoice, the RFID tag location system can facilitate resolving said discrepancies by checking whether products arrived in the shipment, products arrived without RFID tags, and products arrived with incorrect RFID tags.

Electronic notifications may also be automatically sent to customers notifying them of delivery of new shipments of product to a store. The notifications may be sent using a variety of methods including e-mail, text message, messaging applications such as WhatsApp, Facebook messenger, Geofencing applications, or other electronic message services integrated with the RFID tag location system. The notifications may be tailored to Priority Products, e.g., new products, best-selling products, or products elected by customers for notifications, based on customer preferences. The notifications may also be sent to customers who have visited a specific store previously or who have subscribed to receive notifications from a specific retailer or retail location. Retargeted advertisements or electronic messages may also be sent to customers who previously visited a store and were unable to purchase a particular product due to lack of availability, e.g., a Priority Product was not available in a desired size.

The RFID tag location system can also facilitate discovery of products missing RFID tags or have incorrect RFID tags after delivery or during inventory checks. For example, an employee may discover upon inspecting a pile of identical clothing that the stock level of the clothing is zero, which indicates an error in the RFID stock due to missing or erroneous RFID tags. In another example, an employee may be carrying a particular product and visually notice the product is missing an RFID tag. In the event products are discovered to have missing or erroneous RFID tags after receipt and verification of a shipment, employees can add or replace an RFID tag to the product and encode the tag with the correct product information using the RFID reader and User App. Once a new RFID tag is encoded, the RFID stock of the product will be updated and automatic electronic notifications may be sent to customers, as described earlier.

11.7 Automatic Notifications for Product Movement and Holds

The RFID tag location system can also monitor product movement, e.g., if a Priority Product has not been moved to an appropriate location such as the sales floor, or product holds, e.g., a product is not placed on hold for a customer. Based on the RFID tag location data, an electronic notification can be sent to authorized employees, regional management personnel, or corporate management personnel if product movement or products holds do not occur within a certain time threshold established by the retailer, e.g., 30 minutes. The notifications may be sent using a variety of methods including e-mail, text message, messaging applications such as WhatsApp, Facebook messenger, Geofencing applications, or other electronic message services integrated with the RFID tag location system.

11.8 Product Status Based on RFID Tags

The RFID tag location system may also encode additional information in the RFID tag of a product. For example, an RFID status tag may be used, which can include a variety of product statuses and tracking information. The RFID status tag is distinguished from a RFID tag where the RFID status tag can assign the same product information to a set of RFID tags that correspond to the RFID status tag.

Numerous product statuses may be encoded into an RFID tag and may be based on categories including Transfers Out, E-Commerce Orders, and Damages. In the Transfers Out category, product statuses may include (1) merchandise that will be sent from a first store to a second store, a warehouse, or a distribution center, (2) time and date of product status creation, (3) type of Transfer Out, e.g., transfer to a different store, transfer to a warehouse, transfer to a distribution center, transfer of damaged or recalled products, transfer of products to be cleaned or tailored if such services occur off site from the store, (3) origin of merchandise, e.g., store number, (4) destination of merchandise, e.g., store number, distribution center, manufacturing facility number, or (5) a transfer out number, e.g., a tracking number created by the RFID tag location system or existing legacy systems.

In the E-Commerce Orders category, product statuses may include (1) merchandise that will be sent from a store to a third party shipping address specified by the customer placing the order, (2) time and date of product status creation, (3) origin of merchandise, e.g., store number, (4) customer account number, e.g., account created by the e-commerce system, (5) an e-commerce order number, e.g., an order number created by the RFID tag location system or existing legacy e-commerce systems, or (6) e-commerce status, e.g., IN-PROCESS for products picked up and currently in processing area waiting to be packed or PACKED for products that have been picked and packed for outbound shipment.

In the Damages category, product statuses may include (1) merchandise currently unavailable for sale due to contamination, damage, or defects, (2) time and date of product status creation, or (3) a damage transfer number, e.g., a reference number created by the RFID tag location system or existing legacy systems.

The use of RFID status tags can facilitate assignment of a product status in a particular area of a store based on the location accuracy of the RFID tag location system or by product type. For example, an RFID status tag on a particular product can automatically assign the same status to other products in its immediate proximity, e.g., products that are within 4 inches of the product with an RFID tag. In another example, the RFID status tag on a particular product can assign the same status to a group of products across an entire store. A change in status for a group of products can be displayed in the GUI using a different color or symbol for these products. This visual indicator can help an employee to verify the status for the products.

The RFID tag location system can also automatically change product status based on RFID stock of a product. For example, products with RFID tags that have Transfer Out statuses, e.g., transfer to another store, transfer to a warehouse, or transfer to a distribution center, can be considered as available stock for e-commerce orders to be fulfilled by the store sending said products so long as the transfer out process is not confirmed by the store. A confirmation may include the product is in a sealed box, transfer documentation is finalized, etc.

11.9 Tracking Arrival and Departure Routes of Products

The RFID tag location system, which may include an RFID reader, (depth) cameras, and technology to accurately determine the location of RFID tags, can be used to record the path of one or more RFID tagged products, e.g., products with RFID tags or RFID status tags grouped in a box, bag, or cart, through a store as the products enter or leave the store. Using the User App, the path can then be displayed in the GUI to a user as an animation overlaid on a floor plan of the store as shown in FIG. 8.

The RFID tag location system can also play back a recorded video feed of the arrival or departure of the RFID tagged products using the date, time, and location data recorded by the system's location technology and cameras as shown in FIG. 8. Additionally, the RFID tag location system may also identify the individual accompanying the RFID tagged products based on facial or gait recognition, an individuals' Bluetooth or Wi-Fi enabled device, or a user ID.

To ensure a store is fully covered by the RFID tag location system, the components of the RFID tag location system may be mounted on ceilings or walls every 500 to 1000 square feet increments depending on the layout and environment of the store. This enables the RFID tag location system to track all RFID tagged products and Bluetooth or Wi-Fi 33 enabled devices within the store. Additionally, the system can also identify the boundaries of the store, e.g., multiple floors, rooms, entrances, exits, etc. The boundaries of the store may be marked with RFID reference tags or other manual marking methods for detection. In particular, by identifying entrances and exits, the RFID tag location system can automatically register when products have entered or exited the store.

11.10 Smart, Adaptive Floor Display of Product Quantity

The RFID tag location system can enable a user, e.g., an employee, to set a desired quantity of product to be located in a particular area of the store, e.g., 12 units of a product on the floor display. Furthermore, the RFID tag location system can suggest an ideal placement of products to the user based on historical data on the performance of the product in order to maximize sales. For example, a specific product may have multiple variants, e.g., footwear, apparel, accessories, women's wedding dresses with different sizes. The RFID tag location system can suggest to users the highest performing product variants to put on a floor display for that particular store. Historical performance data can include historical sales, number of times a product or product variant is viewed or tested by a customer, or conversion rates of a product or product variant, e.g., views to sales, customer tests to sales, etc.

The RFID tag location system can also dynamically adapt to the quantity and location of products in a store in real-time based on stock inventory available at the store. For example, in Table 1, an ideal scenario is shown where the M and L sized products are the best performing variants followed by S and XL sized products. Based on a user-defined requirement on the total number of products to display, e.g., 12 in this example, the RFID tag location system automatically calculates the number of products for each size to put on the floor display. In this case, more M and L sized products are shown than S and XL sized products since they are higher performing.

TABLE 1

Ideal Scenario

| | Total # to Display | | | |
|---|---|---|---|---|
| | 12 S | M | L | XL |
| Floor Display Quantity | 2 | 4 | 4 | 2 |
| Sales Floor Quantity | 3 | 1 | 3 | 2 |
| Stock Room Quantity | 10 | 12 | 8 | 9 |

In another example, Table 2 shows an adapted scenario where M sized products are insufficiently stocked and thus cannot fulfill the ideal floor display previously shown in Table 1. In response, the RFID tag location system reallocates the number of product variants to put on the floor display based on the next best performing product variant. This doesn't necessitate that zero M sized products are displayed, but rather the number of M sized products is reduced to accommodate available stock and customer demand. In this case, more L sized products are displayed followed by S and XL sized products.

TABLE 2

Adapted Scenario A

| | Total # to Display | | | |
|---|---|---|---|---|
| | 12 S | M | L | XL |
| Floor Display Quantity | 3 | 1 | 5 | 3 |
| Sales Floor Quantity | 3 | 1 | 3 | 3 |
| Stock Room Quantity | 10 | 0 | 8 | 9 |

Table 3 shows yet another adapted scenario where both M and L sized products are sold out and there is an insufficient stock of other product variants to meet the required total number of products. In this case, the RFID tag location system will reallocate the number of product variants to fulfill the total number of products to display as best as possible while prioritizing best performing sizes as well.

TABLE 3

Adapted Scenario B

| | Total # to Display | | | |
|---|---|---|---|---|
| | 12 S | M | L | XL |
| Floor Display Quantity | 6 | 0 | 0 | 3 |
| Sales Floor Quantity | 3 | 0 | 0 | 3 |
| Stock Room Quantity | 3 | 0 | 0 | 0 |

The RFID tag location system will also set the quantity of a product on the floor display to zero if the sales floor quantity is set to zero. Furthermore, notifications may be sent to employees if at least one product is on the sales floor, but no products are on the floor display. This is based on one possible retailer strategy where all products available on the sales floor should also be placed on the floor display. The RFID tag location system may also be configured to detect discrepancies in the quantity of product on the sales floor and the floor display, particularly to compensate for input errors to the system.

11.11 Creation and Optimization of Pick Lists

As described earlier, the RFID tag location system can accurately track the quantity of products located in different areas of a store, e.g., the sales floor or the stockroom, and can thus determine what products or product variants may need to be moved to the sales floor in real-time. For example, Table 4 shows a distribution of product variants in a store. As shown, there is an insufficient number of M and XL sized products available on the sales floor based on the number of products shown on the floor display. As a result, two M sized and one XL sized products should be moved from the stockroom to the sales floor.

TABLE 4

Distribution of Products in a Store

|  | Total # to Display | | | |
| --- | --- | --- | --- | --- |
|  | 12 S | M | L | XL |
| Floor Display Quantity | 3 | 3 | 3 | 3 |
| Sales Floor Quantity | 3 | 1 | 3 | 2 |
| Stock Room Quantity | 10 | 12 | 8 | 9 |

To facilitate replenishment of a products or product variants, the RFID tag location system can instantaneously compile a pick list, or a list of requested products, that need to be replenished in real-time. The pick list can then be sent to a user, e.g., a stockroom employee, who then completes the request by pick up all requested products and delivers the products to the sales floor.

The use of a pick list may also be applicable to fulfill e-commerce orders where the RFID tag location system compiles a list of products requested by online customers to be picked up at the store. The products in the pick list may also be placed on hold by an employee on behalf of the customers, by a customer using a retailer's website or application, or by a customer variant of the User App. Pick lists may also be used in customer stock requests, where products are requested from the stockroom by an in-store customer via a sales floor employee, or for misplaced products, where products are placed in incorrect locations on the sales floor or in the stockroom.

Figure 9D:
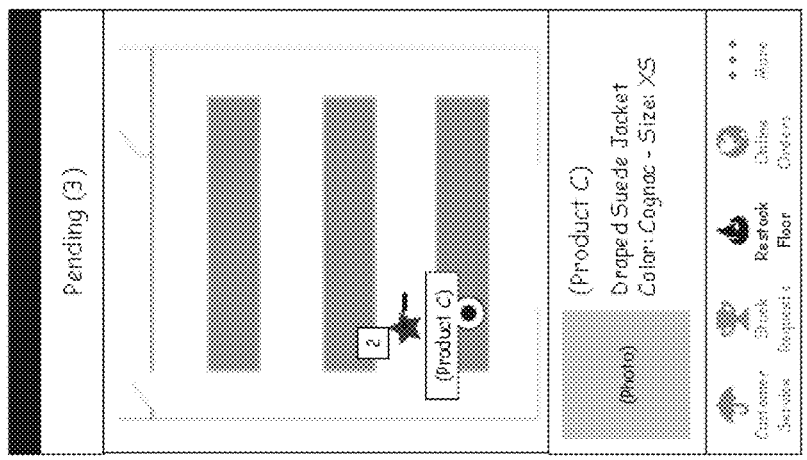
Figure 9C:
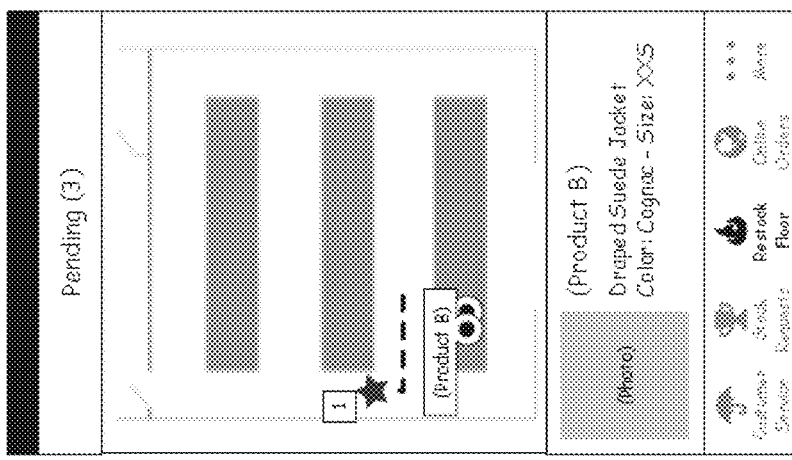
Figure 9B:
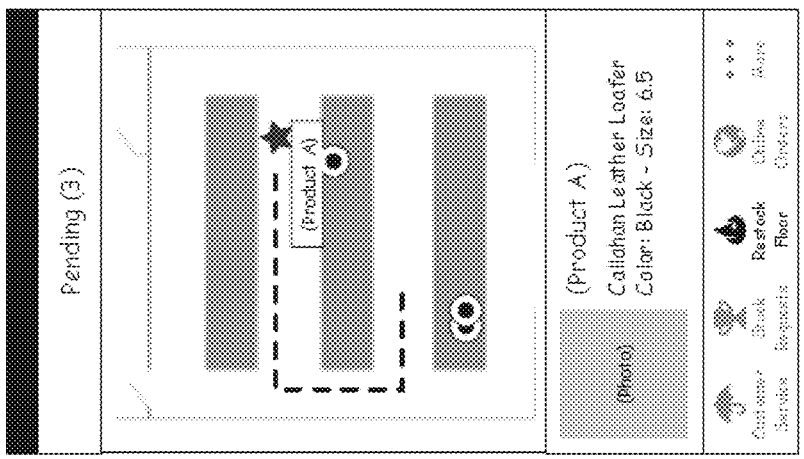

Since the RFID tag location system can track the location of a user, e.g., a stockroom employee, and the locations of all products in the pick list, an optimized pick path (OPP) can be generated, based on the shortest time or distance for an employee to pick up all products. The OPP can be displayed to the user in the GUI of the User App. In FIG. 9A, the OPP is displayed as a dotted line along with the locations of the nearest product on the pick list and the user. The OPP will update as the user moves, as shown in FIG. 9B. As the user begins picking up products on the pick list, the OPP will continue to update and will also show the number of products picked up by the user as shown in FIG. 9C and FIG. 9D. Also, the next product to be picked up by the user will also be displayed in the GUI. An OPP may also be used for e-commerce orders, customer stock checks, and moving misplaced products in the stockroom or on the sales floor.

In the event a product on the pick list of a first user is picked up and delivered to the sales floor by second user and the first user is still in the process of fulfilling the request and before picking up said product, the RFID tag location system will specially mark the product on the first user's pick list to notify the first user that the product is no longer needed. This notification process can be performed in real-time using the RFID tag location system.

11.12 Pick List Filters

The RFID tag location system can also enable a user to refine a pick list based on product attributes or location. For example, a user may filter a pick list according to women's wedding dresses, stockroom 1, or women's wedding dresses in stockroom 1. Furthermore, a user can set a maximum quantity of products to be included in a pick list, e.g., 10 units. The RFID tag location system will then show a pick list with up to 10 units. Based on user filters and the maximum quantity, the RFID tag location system can optimize the products on the pick list that generate the most sales for a store.

11.13 Stray Products

Stray products are products that are placed in incorrect locations within the store, e.g., a product is designated to be on the sales floor, but is instead located in the stockroom. The RFID tag location system can actively and accurately track the location of units of specific products, e.g., all units of a men's black V-neck T-shirts are all located on the sales floor or in the stockroom. The combination of the RFID tag location system's location accuracy and ability to monitor all units of a particular product can enable automatic detection of stray products in the store. If stray products are detected, notifications may be automatically sent immediately to users, e.g., employees, or sent after a user-defined time threshold, e.g., greater than 10 minutes, that units of a product are in an incorrect location.

Figure 10:
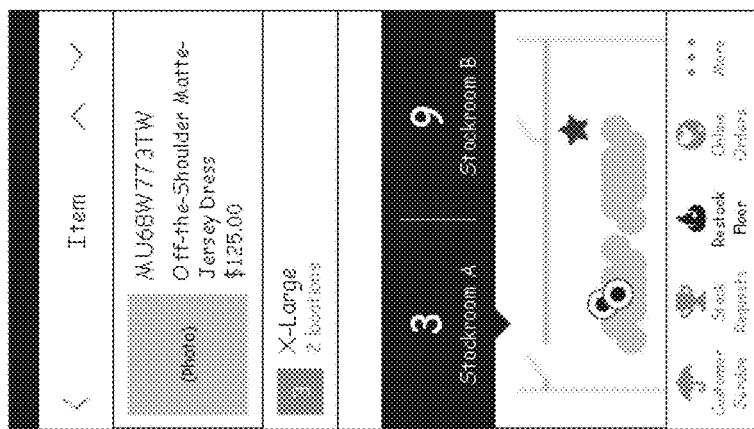
FIG. 10 shows how the GUI can be used to identify and locate stray items with RFID tags.

Furthermore, the User App can also generate a path within the GUI to direct a user to all stray products. This path generation feature can also be used for non-stray products as well. By way of example, FIG. 10 shows a GUI where a specific product is selected within a store. The units of the selected product may not be located in the same stock room nor in the same area of a particular stockroom, e.g., the units of a product may not be located within six feet of one another. In these instances, the GUI may display to the user the total number of locations the user must visit to retrieve all units of a product.

11.14 Intelligent Routing of Product Notifications to Users

The RFID tag location system, in particular the RFID reader, the User App, and the location tracking features of the system, can be used to monitor the location of a product, or a variant of the product, accurately. By tracking all RFID-tagged products within a store, the system can automatically notify users, e.g., employees, if a product needs to be replenished in a particular area of the store in real time. The threshold or criteria for product replenishment can be by the users. For example, a product may be required to have 10 units located on the floor display. If initially there are 10 units of a product on the floor display and a customer purchases 1 unit, a notification can be sent to an employee that the quantity of product on the floor display has fallen below the specified requirement, prompting the employee to transfer 1 unit of product to the floor display.

An employee receiving a notification for product replenishment may also send a request for the product to another employee, e.g., a sales floor employee can request a product from a stockroom employee, using an Internal Stock Request. In the event the requested product is not in stock at the first store, an employee can instead use an External Store Request to request the product from a second store or warehouse and delivered to the first store or to a customer's preferred address. This tracking feature can also be used my customers using the User App with their mobile device to locate a particular product with an RFID tag in a store or another nearby store.

The RFID tag location system can also intelligently route stock requests to a particular employee or location to minimize time to deliver requested stock to a particular area of a store or to a customer. Internal stock requests may be routed to employees based on their proximity to the area of the store, a customer, or to the stockroom and ability to complete task in the shortest time. For example, employee A is working on 5 stock requests for other customers, they must prioritize completing those 5 stock requests. The RFID tag location system can then route additional requests to the nearest available employee, e.g., employee B, to fulfill the stock request. Employees may also have the option to turn off or mute notifications for stock requests if currently performing an unrelated task. The RFID tag location system can also monitor the time taken for an employee to complete a stock request, from the initial receipt of the stock request to delivery of product to a customer or area of the store, by tracking the product and employee as they move through the store.

For external stock requests, the RFID tag location system can actively monitor and update the availability of products at multiple stores. For example, if a customer at second store has a requested product in their shopping cart, the RFID tag location system will remove this product from the available stock at the second store to ensure customers at the first store have accurate information regarding product availability. The RFID tag location system can also be used to predict the time required for an externally requested product to be delivered to a store or customer's preferred address based on the distance between the originating location, e.g., a second store or warehouse, and the destination and data detailing the speed that stock requests are fulfilled and shipped by the originating location.

11.15 Stock Request Fulfillment

Figure 11:
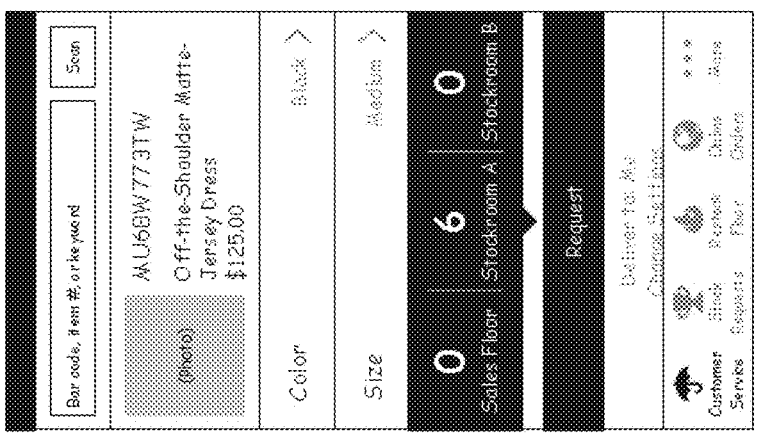
FIG. 11 shows how the GUI can be used to fulfill stock requests of items with RFID tags.

The RFID tag location system actively tracks the location of products available on a sales floor of a store and a stockroom in real-time and at all times. This active tracking can facilitate employees to quickly complete stock requests to customers. For example, a customer may request a stock level check for a particular product in the store using the User App. FIG. 11 shows an example GUI where a customer is requesting a product with options to specify a particular product variant, e.g., a medium-sized, black dress, from a stockroom to be delivered to them on the sales floor. This request can then be sent to an employee on the sales floor. The sales floor employee can then use the User App to request the customer requested product from a stockroom employee. The stockroom employee can then locate and pick up multiple requested products for different customers. To facilitate delivery of the products to the different customers on the sales floor, the stockroom employee can use the User App, which actively monitors the location of the different customers in real-time.

Figure 12:
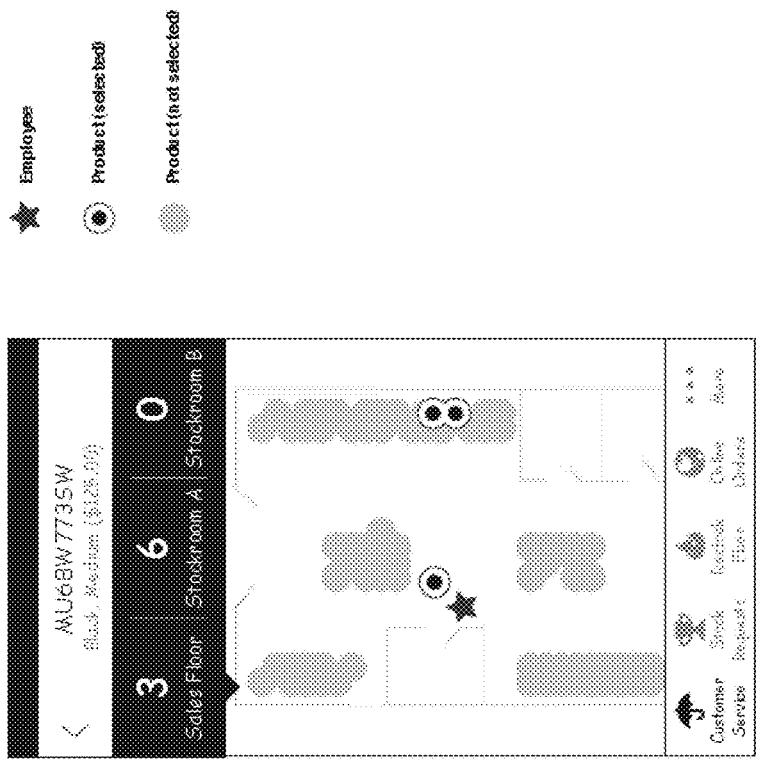
FIG. 12 shows how the GUI can be used to show location(s) of a selected product tagged with an RFID tag on the sales floor and/or in a stockroom.

In addition to stock requests, there may be cases where a product is misplaced or not easily found by a customer but are nonetheless present on the sales floor. The User App can provide the location of the products, if present, in various areas of the store. For example, in FIG. 12, the GUI may show a customer the locations of a selected product on the sales floor, in addition to the quantity available in a stockroom. In the event the employees of the store do not move the misplaced products on the sales floor, the User App can also enable a customer to locate said misplaced products.

11.16 Automatic Marking of a Pick List

A pick list refers to a list of products requested by a user and may include requests for internal replenishment, e-commerce orders, stock requests, misplaced products, or any other list of products a user needs to locate. Products in the pick list can be automatically marked as picked up if the following conditions are met: (1) the user is working on a pick list using the User App, (2) the user picks up a product in the pick list, and (3) the RFID/computer vision item location system recognizes a product on the user's pick list is picked up by the user if the product is moving with the user based on the user's device or their RFID employee tag. Once these conditions are met, the RFID/computer vision item location system should automatically mark the product as picked up by the user. To improve the accuracy of automatic marking of pick lists, a threshold may be used to determine if a product is picked up by a user such as time after product is picked up or distance the product has moved.

11.17 Tracking Customers with High Cart Values

The RFID tag location system can also be used to actively track the quantity and type of products in a customer's shopping cart in real-time. A shopping cart may include a basket, a bag, a cart, etc. In the event a customer's shopping cart contains products that exceed a user-defined threshold, e.g., 5 total units or $500 value, a notification can be automatically sent to employees identifying these customers. Additionally, specific products or product categories can also be flagged by employees to prioritize tracking. This tracking feature may have multiple functional uses in a store. For example, the tracking feature can be used to prevent shoplifting by tracking customers who may have a large quantity or value of products in their shopping cart or may have selected numerous flagged products. The tracking feature can also be used to identify customers who may be willing to spend more money, which can notify employees to provide these customers with better customer service, to upsell these customers, or to recommend complimentary products to these customers.

The RFID tag location data may be displayed to users using the GUI in the User App in various formats. For example, employees can view all customers within a store in the GUI and monitor their shopping carts based on the quantity of products or by the total value. To facilitate identification of a customer, if a customer uses a customer variant of the User App, the RFID tag location system can associate a person in the store with a customer profile. Otherwise, a customer may be still be identified with products in their shopping cart by tracking the motion of products and determining whether the products are associated with a registered employee device.

11.18 Automatic Notification of VIP Customers

The RFID tag location system may also store data on customers. This data may include the number of visits a customer makes to a store or the amount of money a customer spends on a monthly or yearly basis. Based on this data, a VIP designation can be attributed to customers who exceed user-defined thresholds.

The RFID tag location system can then be used to detect and identify a VIP customer and to notify employees when a VIP enters a store or a particular section of a store. Identification of a VIP may be accomplished using numerous methods including (1) detection of a VIP status based on a customer's profile stored in the User App on a customer's mobile device via Bluetooth or Wi-Fi, (2) recognition of a customer mobile device id based on the User App on a customer's mobile device, or (3) identification based on facial or gait recognition using the computer vision capabilities of the RFID tag location system.

11.19 Identification of Potential Product Theft

As described earlier, the RFID tag location system can actively track the movement of products in a customer's shopping cart in real-time. Potential theft of products can be detected if anomalous events occur while monitoring the products. For example, if a customer were to remove a RFID tag from a product, the RFID tag location system can detect this removal and immediately notify an employee this exact product and its last known location in the store. Furthermore, the RFID tag location system can also identify and retrieve video footage recorded by the system's cameras or RFID readers to assist employees in locating the customer or product. Once this information is provided to an employee, the employee can then approach the customer to offer assistance with the product missing the RFID tag.

The RFID tag location system can also timestamp and store anomalous events related to RFID tagged products. This information can be used to show employees in the GUI potentially high theft zones within the store based on data such as the frequency of RFID tags that disappear. This data can be viewed in the GUI with user-defined time frames, e.g., previous 7, 30, 180 days, and so on. Furthermore, the RFID tag location system can also identify and highlight zones in the store that may potentially become high theft zones by identifying the current location of RFID tags that are prone to disappearing within the store.

11.20 Automatic Monitoring of Fitting Rooms

A detection strategy similar to the identification of potential product theft can also be used for automated monitoring of fitting rooms. The RFID tag location system can track products as they enter or exit a fitting room. Notifications can be sent to employees of products that enter or exit a fitting room in real-time. In the event a product is left in a fitting room, the RFID tag location system can notify the employee a stray product is present in the fitting room and to return the product to its correct location within the store. If a RFID tag were to be removed, resulting in the disappearance of a product in the RFID tag location system, notifications can also be sent to employees that a product may have disappeared and identify the customer the product was last associated with. A customer may also be identified by other products in their shopping cart when the product in question disappeared.

11.21 Capture and Measure of Customer and Product Interaction

The RFID tag location system can also be used to detect and measure data related to customer and product interaction within a store. For example, the system may track (1) how frequently a product is picked up by a customer, (2) how long a product is viewed by a customer, (3) what products are viewed together, (4) what product a customer is holding while viewing a new product, (5) what products may be taken from a fitting room, (6) what products a customer interacts with prior to realizing purchase, (7) products that may be tested by a customer, e.g., a customer trying on clothing, based on measured distortion of a RF signal due to proximity to a body of water, e.g., the human body, (8) how long a customer tests a product. For products tested by a customer, information may also be collected on unpurchased products, e.g., clothing left in a fitting room, to assess manufacturing or fit issues, e.g., customers prefer the look of a piece of clothing, but not its fit. This data can be used to inform stores how to potentially modify manufacture of the products to improve sales.

To measure these parameters, the RFID tag location system is capable of tracking objects in a 3D space with high spatial and temporal resolution. For example, the RFID tag location system can detect if a product is moved beyond a threshold distance, e.g., 4 inches, and held for threshold period of time, e.g., more than 3 seconds. If such conditions are met, the product can be considered as picked up or viewed by a customer.

As described earlier, the RFID tag location system can track the motion of products and customers within a store. Customers may be identified either by (1) a customer using a User App on their mobile device, which is detected by Bluetooth, Wi-Fi, or another wireless communication system or sensor, or (2) by detecting customers based on individuals who neither have a device or tag identifiable by the RFID tag location system assuming employees will have a tag or device.

The RFID tag location system can also collect product performance data according to product groups such as product categories, sub-categories, products, colors, sizes, price ranges, any combination of the former types described, and so on. For these product groups, the performance data that can be collected include the following: (1) the most or least viewed product groups, (2) the longest or shortest viewed product groups, (3) product groups that are taken to a fitting the most or least, (4) product groups that are tested or tried on the most or least, (5) product groups that are tested or tried on the longest or shortest period of time, (6) product groups that have the best or worst conversion, which is defined as quantity of sales versus the other types of data mentioned. For example, if a product is viewed 100 times daily and sold 10 times daily, the conversion rate is 10%. In another example, if 100 products are tried on for more than 30 seconds and have 10 sales, then products that are tried on for more than 30 seconds have a 10% conversion rate.

Based on the product performance data collected by the RFID tag location system, improvements to store operation can be achieved by: (1) identifying best performing sales areas in the store, (2) identifying areas with the most product interaction to improve staffing in that area, or (3) merchandising strategies such as automatic calculation and recommendation of product assortments based on best-selling combinations, e.g., black jeans and white T-shirts perform best together, or identifying areas of a store that are best for certain product types, e.g., dresses have the highest conversion rate in Zone A of a store.

Similarly, the product performance data can improve the consumer shopping experience by: (1) understanding a customer's historical shopping preferences, based on the product groups defined earlier, to notify customer's the arrival of new or restocked products the customer was previously searching in the store or online, (2) personalizing the in-store shopping experience by highlighting products within a store or within a zone in the store that a customer may be interested in, (3) notifying customers of potential in-store promotions, or (4) identifying the customer by detecting a customer's profile stored in the User App on a customer's mobile device via Bluetooth or WiFi, recognizing a customer mobile device id based on the User App on a customer's mobile device, or identifying a customer based on facial or gait recognition using the computer vision capabilities of the RFID tag location system.

12 Conclusion

While various embodiments have been described and illustrated herein, a variety of other means and/or structures for performing the function and/or obtaining the results and/or one or more of the advantages described herein is possible. More generally, all parameters, dimensions, materials, and configurations described herein are meant to be exemplary and that the actual parameters, dimensions, materials, and/or configurations will depend upon the specific application or applications for which the disclosed teachings is/are used. It is to be understood that the foregoing embodiments are presented by way of example only and that embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The above-described embodiments can be implemented in any of numerous ways. For example, embodiments of the technology disclosed herein may be implemented using hardware, software or a combination thereof. When implemented in software, the software code can be executed on any suitable processor or collection of processors, whether provided in a single computer or distributed among multiple computers.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, various disclosed concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein, the terms "about" and "approximately" generally mean plus or minus 10% of the value stated.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method of locating a radio-frequency identification (RFID) tag with an RFID tag location system comprising an antenna array operably coupled to a processor, the method comprising:
   in a training phase,
      for each of a plurality of reference RFID tags, measuring, with the antenna array, a reference signature representing radio-frequency (RF) power received by the antenna array from the reference RFID tag, each reference RFID tag being at a known location; and
   in an operational phase after the training phase,
      measuring, with the antenna array, a signature representing RF power received by the antenna array from an RFID tag at an unknown location;
      comparing the signature to a previously measured signature of the RFID tag;
      in response to the signature not matching the previously measured signature, performing a comparison of the signature to the reference signatures; and
      determining, based on the comparison, an estimated position of the RFID tag relative to the known location of at least one of reference RFID tag in the plurality of reference RFID tags.

2. The method of claim 1, wherein measuring the reference signature for at least one reference RFID tag comprises receiving at least a first portion of the RF power from the at least one reference RFID tag via a line-of-sight (LOS) path from the at least one reference RFID tag to the antenna array.

3. The method of claim 2, wherein measuring the reference signature for at least one reference RFID tag further comprises receiving a second portion of the RF power from the at least one reference RFID tag via at least one non-line-of-sight (NLOS) path from the at least one reference RFID tag to the antenna array.

4. The method of claim 3, wherein measuring the signature for the RFID tag comprises receiving the RF power from the RFID tag via a LOS path and at least one NLOS path from the RFID tag to the antenna array.

5. The method of claim 1, wherein the antenna array is a two-dimensional antenna array.

6. The method of claim 1, wherein performing the comparison of the signature to the reference signatures comprises clustering reference RFID tags in the plurality of reference RFID tags and the RFID tag based on the reference signatures.

7. The method of claim 1, wherein determining the estimated position of the RFID tag comprises weighting actual locations of reference RFID tags in the plurality of reference RFID tags according to the comparison.

8. The method of claim 7, wherein weighting the actual locations of the reference RFID tags is based on a distance metric.

9. The method of claim 1, wherein performing the comparison of the signature to the reference signatures comprises determining an error between the signature and one of the reference signatures.

10. The method of claim 9, wherein determining the estimated position of the RFID tag comprises estimating a distance between the RFID tag and at least one reference RFID tag in the plurality of reference RFID tags based on the error.

11. The method of claim 9, wherein determining the estimated position of the RFID tag comprises nonlinearly weighting a distance between the RFID tag and at least one reference RFID tag in the plurality of reference RFID tags based on the error.

12. The method of claim 1, further comprising:
   estimating an absolute location of the RFID tag based on the estimated position of the RFID tag with a precision of better than 50 cm.

13. The method of claim 1, further comprising:
   estimating an absolute location of the RFID tag based on the estimated position of the RFID tag with a precision of better than 25 cm.

14. The method of claim 1, further comprising:
   estimating an absolute location of the RFID tag based on the estimated position of the RFID tag with a precision of better than 5 cm.

15. The method of claim 1, further comprising, after a change in an environment containing the plurality of reference RFID tags:
   repeating the training phase.

16. The method of claim 15, wherein the change in the environment comprises at least one of a change in a number of reference RFID tags in the plurality of reference RFID tags, a change in location of at least one reference RFID tag in the plurality of reference RFID tags, or a change in a number, type, or location of an obstruction responsible for multipath effects.

17. The method of claim 1, further comprising:
   displaying, to a user via a mobile device, the estimated position of the RFID tag.

18. The method of claim 17, wherein the estimated position is in at least one of a store, a stockroom, or a warehouse, and further comprising:
   determining, based on the estimated position, a path from the user to the RFID tag; and
   displaying, to the user via the mobile device, the path from the user to the RFID tag.

19. The method of claim 18, further comprising:
   determining, based on the estimated position, a path for the user from the RFID tag to a target location of the RFID tag; and
   displaying, to the user via the mobile device, the path from the RFID tag to the target location of the RFID tag.

20. The method of claim 19, wherein the RFID tag is a first RFID tag, and further comprising:
   determining a path for the user from the first RFID tag to an estimated position of a second RFID tag en route to the target location; and
   displaying, to the user via the mobile device, the path from the first RFID tag to the estimated position of the second RFID tag en route to the target location.

21. The method of claim 17, further comprising:
   displaying, to the user via the mobile device, information about an item associated with the RFID tag.

22. A radio-frequency identification (RFID) tag location system comprising:
   an antenna array to measure, in a training phase for each of a plurality of reference RFID tags, a reference signature representing radio-frequency (RF) power received by the antenna array from the reference RFID tag, each reference RFID tag being at a known location, and to measure, in an operational phase after the training phase, a signature representing RF power received by the antenna array from an RFID tag at an unknown location; and
   a processor, operably coupled to the antenna array, to perform, in the operational phase, a comparison of the signature to a previously measured signature of the RFID tag and, if the signature does not match the previously measured signature, to perform a comparison of the signature to the reference signatures and to determine, based on the comparison of the signature to the reference signatures, an estimated position of the RFID tag relative to the known location of at least one of reference RFID tag in the plurality of reference RFID tags.

23. The RFID tag location system of claim 22, wherein the antenna array is configured to receive at least a first portion of the RF power from at least one reference RFID tag via a line-of-sight (LOS) path from the at least one reference RFID tag to the antenna array.

24. The RFID tag location system of claim 23, wherein the antenna array is configured to receive a second portion of the RF power from the at least one reference RFID tag via at least one non-line-of-sight (NLOS) path from the at least one reference RFID tag to the antenna array.

25. The RFID tag location system of claim 24, wherein the antenna array is configured to receive the RF power from the RFID tag via a LOS path and at least one NLOS path from the RFID tag to the antenna array.

26. The RFID tag location system of claim 22, wherein the antenna array is a two-dimensional antenna array.

27. The RFID tag location system of claim 22, wherein the processor is configured to perform the comparison of the signature to the reference signatures by clustering reference RFID tags in the plurality of reference RFID tags and the RFID tag.

28. The RFID tag location system of claim 22, wherein the processor is configured to determine the estimated position of the RFID tag by weighting actual locations of reference RFID tags in the plurality of reference RFID tags according to the comparison.

29. The RFID tag location system of claim 28, wherein the processor is configured to weight the actual locations of the reference RFID tags based on a distance metric.

30. The RFID tag location system of claim 22, wherein the processor is configured to perform the comparison of the signature to the reference signatures by determining an error between the signature and one of the reference signatures.

31. The RFID tag location system of claim 30, wherein the processor is configured to estimate a distance between the RFID tag and at least one reference RFID tag in the plurality of reference RFID tags based on the error.

32. The RFID tag location system of claim 30, wherein the processor is configured to nonlinearly weight a distance between the RFID tag and at least one reference RFID tag in the plurality of reference RFID tags based on the error.

33. The RFID tag location system of claim 22, wherein the processor is configured to estimate an absolute location of the RFID tag based on the estimated position of the RFID tag with a precision of better than 50 cm.

34. The RFID tag location system of claim 22, wherein the processor is configured to estimate an absolute location of the RFID tag based on the estimated position of the RFID tag with a precision of better than 25 cm.

35. The RFID tag location system of claim 22, wherein the processor is configured to estimate an absolute location of the RFID tag based on the estimated position of the RFID tag with a precision of better than 5 cm.

36. The RFID tag location system of claim 22, wherein the processor is configured to transmit, to a mobile device, the estimated position of the RFID tag.

37. The RFID tag location system of claim 36, wherein the estimated position is in at least one of a store, a stockroom, or a warehouse, and the mobile device is configured to display a path to the RFID tag.

38. The RFID tag location system of claim 37, wherein the mobile device is configured to display a path from the RFID tag to a target location for the RFID tag.

39. The RFID tag location system of claim 38, wherein the RFID tag is a first RFID tag, and wherein the mobile device is further configured to display a path from the first RFID tag to an estimated position of a second RFID tag en route to the target location.

40. The RFID tag location system of claim 36, wherein the mobile device is further configured to display information about an item associated with the RFID tag.

41. The method of claim 1, wherein determining the estimated position of the RFID tag comprises correlating the signature with a library of expected responses from the RFID tag.

42. The method of claim 1, further comprising, in the training phase:
   calibrating the RFID tag location system based on the reference signatures and the known locations of the plurality of reference RFID tags.

43. The method of claim 1, further comprising, in the training phase:
 for each of the plurality of reference RFID tags, measuring, with the antenna array, the RF power from the reference RFID tag at each of a plurality of angles of arrival.

\* \* \* \* \*